(12) United States Patent
Oto

(10) Patent No.: US 11,616,244 B2
(45) Date of Patent: Mar. 28, 2023

(54) ELECTROCHEMICAL APPARATUS AND HYDROGEN SYSTEM

(71) Applicant: Panasonic Intellectual Property Management Co., Ltd., Osaka (JP)

(72) Inventor: Takashi Oto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 359 days.

(21) Appl. No.: 16/935,173

(22) Filed: Jul. 21, 2020

(65) Prior Publication Data

US 2020/0350606 A1 Nov. 5, 2020

Related U.S. Application Data

(63) Continuation of application No. PCT/JP2019/014629, filed on Apr. 2, 2019.

(30) Foreign Application Priority Data

May 15, 2018 (JP) .............................. JP2018-094045

(51) Int. Cl.
*H01M 8/04746* (2016.01)
*H01M 8/0438* (2016.01)
(Continued)

(52) U.S. Cl.
CPC ..... *H01M 8/04746* (2013.01); *H01M 8/0438* (2013.01); *H01M 8/0612* (2013.01); *H01M 8/0656* (2013.01); *H01M 8/1233* (2013.01)

(58) Field of Classification Search
CPC .................. H01M 8/0625; H01M 8/04746
See application file for complete search history.

(56) References Cited

U.S. PATENT DOCUMENTS

2003/0035983 A1 2/2003 Ukai et al.
2014/0087279 A1 3/2014 Kiyohiro

FOREIGN PATENT DOCUMENTS

JP 9-306531 11/1997
JP 2002-161815 6/2002
(Continued)

OTHER PUBLICATIONS

English translation of JP2015201351 obtained via Google Patents Sep. 9, 2022 (Year: 2022).*

(Continued)

*Primary Examiner* — Sarah A. Slifka
(74) *Attorney, Agent, or Firm* — McDermott Will & Emery LLP

(57) ABSTRACT

An electrochemical apparatus includes: a reformer that produces a first hydrogen-containing gas by reforming a raw material; a combustor that heats the reformer; an electrochemical device that includes an anode and a cathode, the electrochemical device operating by using the first hydrogen-containing gas supplied to the anode; a first flow rate controller that controls a flow rate of the first hydrogen-containing gas supplied to the anode and a flow rate of a second hydrogen-containing gas supplied from a supply source, the second hydrogen-containing gas being different from the first hydrogen-containing gas; a second flow rate controller that controls a flow rate at which an anode-off gas exhausted from the anode is recycled to the anode and a flow rate at which the anode-off gas is supplied to the combustor; and a controller that controls the first flow rate controller and the second flow rate controller.

10 Claims, 5 Drawing Sheets

(51) Int. Cl.
*H01M 8/0612* (2016.01)
*H01M 8/0656* (2016.01)
*H01M 8/1233* (2016.01)

(56) References Cited

FOREIGN PATENT DOCUMENTS

| | | |
|---|---|---|
| JP | 2003-151592 | 5/2003 |
| JP | 2007-055820 | 3/2007 |
| JP | 2009-001453 | 1/2009 |
| JP | 2015-201351 | 11/2015 |

OTHER PUBLICATIONS

English translation of JP0930653 1obtained via Google Patents Sep. 9, 2022 (Year: 2022).*
The Extended European Search Report dated Jun. 9, 2021 for the related European Patent Application No. 19803964.6.
International Search Report of PCT application No. PCT/JP2019/014629 dated Jun. 11, 2019.
Hiroyuki Ota et al., "Toshiba Review", Toshiba Corporation, vol. 71, No. 5 (2016), Sep. 2016, pp. 30-36.

* cited by examiner

ELECTROCHEMICAL APPARATUS AND HYDROGEN SYSTEM

BACKGROUND

1. Technical Field

The present disclosure relates to an electrochemical apparatus and a hydrogen system.

2. Description of the Related Art

As depletion of fossil fuels such as coal and oil and global warming caused by carbon dioxide have been perceived as problems, efforts have recently been actively made to achieve energy-oriented societies that depend less on fossil fuels. One of such efforts include the ongoing development of a fuel cell system (hereinafter referred to as "PEFC system") including a solid polymer electrolyte fuel cell (hereinafter referred to as "PEFC").

There has been proposed a hydrogen-recycle PEFC system in which in a case where a high-purity hydrogen gas is used as fuel gas in a PEFC, an anode-off gas that was not used in the generation of electricity by the PEFC is returned to the PEFC for reutilization (recycle) (see, for example, Japanese Patent No. 3893945). This makes it possible to utilize the hydrogen gas with high efficiency, thus making it possible to improve the efficiency in the generation of electricity by the PEFC system.

Meanwhile, there has been proposed a fuel-reforming PEFC system in which in a case where city gas, natural gas, liquefied natural gas (hereinafter referred to as "LNG"), liquefied petroleum gas (hereinafter referred to as "LPG"), or kerosene is used as a raw material in a PEFC, a reformed gas (hydrogen-containing gas) produced by steam reforming of the raw material is used as fuel gas (see, for example, Japanese Patent No. 4954510). In this case, the raw material, such as city gas, natural gas, LNG, LPG, or kerosene, which is high in energy density per mole, is convenient for PEFC fuel storage and transportation. However, for reasons such as a low concentration of hydrogen in the reformed gas and the endothermicity of a steam-reforming reaction, this type of PEFC system produces heat for the steam-reforming reaction by burning, with a combustor, an anode-off gas that was not used in the generation of electricity by the PEFC.

Accordingly, the fuel-reforming PEFC is lower in efficiency in the generation of electricity than the hydrogen-recycle PEFC system.

Incidentally, with a view toward the construction of clean hydrogen-based societies, there has been proposed an electricity-generating system in which hydrogen produced through the use of electric power obtained by renewable energy is utilized as fuel for fuel cells, whereby self-sufficiency of electric power that is consumed by houses, buildings, and the like is achieved without dependence on the existing publicly distributed electricity (see, for example, Toshiba Review Vol. 71 No. 5 (2016) p. 30-36).

SUMMARY

However, Toshiba Review Vol. 71 No. 5 (2016) p. 30-36 fails to give due consideration to a possibility that in a case where a hydrogen-containing gas is produced through the use of electric power obtained by renewable energy, insufficiency of a hydrogen-containing gas supplied to an electrochemical device might bring about obstacles to continuous running of an electrochemical apparatus.

One non-limiting and exemplary embodiment provides an electrochemical apparatus that continuously runs more appropriately than a conventional one without deactivation of an electrochemical device.

Further, one non-limiting and exemplary embodiment provides a hydrogen system that continuously runs more appropriately than a conventional one without deactivation of an electrochemical device even in a case where a hydrogen-containing gas is produced through the use of electric power obtained by renewable energy.

In one general aspect, the techniques disclosed here feature an electrochemical apparatus including: a reformer that produces a first hydrogen-containing gas by reforming a raw material; a combustor that heats the reformer; an electrochemical device that includes an anode and a cathode, the electrochemical device operating by using the first hydrogen-containing gas supplied to the anode; a first flow rate controller that controls a flow rate of the first hydrogen-containing gas supplied to the anode of the electrochemical device and a flow rate of a second hydrogen-containing gas supplied from a supply source, the second hydrogen-containing gas being different from the first hydrogen-containing gas; a second flow rate controller that controls a flow rate at which an anode-off gas exhausted from the anode of the electrochemical device is recycled to the anode of the electrochemical device and a flow rate at which the anode-off gas is supplied to the combustor; and a controller that controls the first flow rate controller and the second flow rate controller.

An electrochemical apparatus according to an aspect of the present disclosure brings about an effect of being able to continuously run more appropriately than a conventional one without deactivation of an electrochemical device.

Further, a hydrogen system according to an aspect of the present disclosure brings about an effect of being able to continuously run more appropriately than a conventional one without deactivation of an electrochemical device even in a case where a hydrogen-containing gas is produced through the use of electric power obtained by renewable energy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
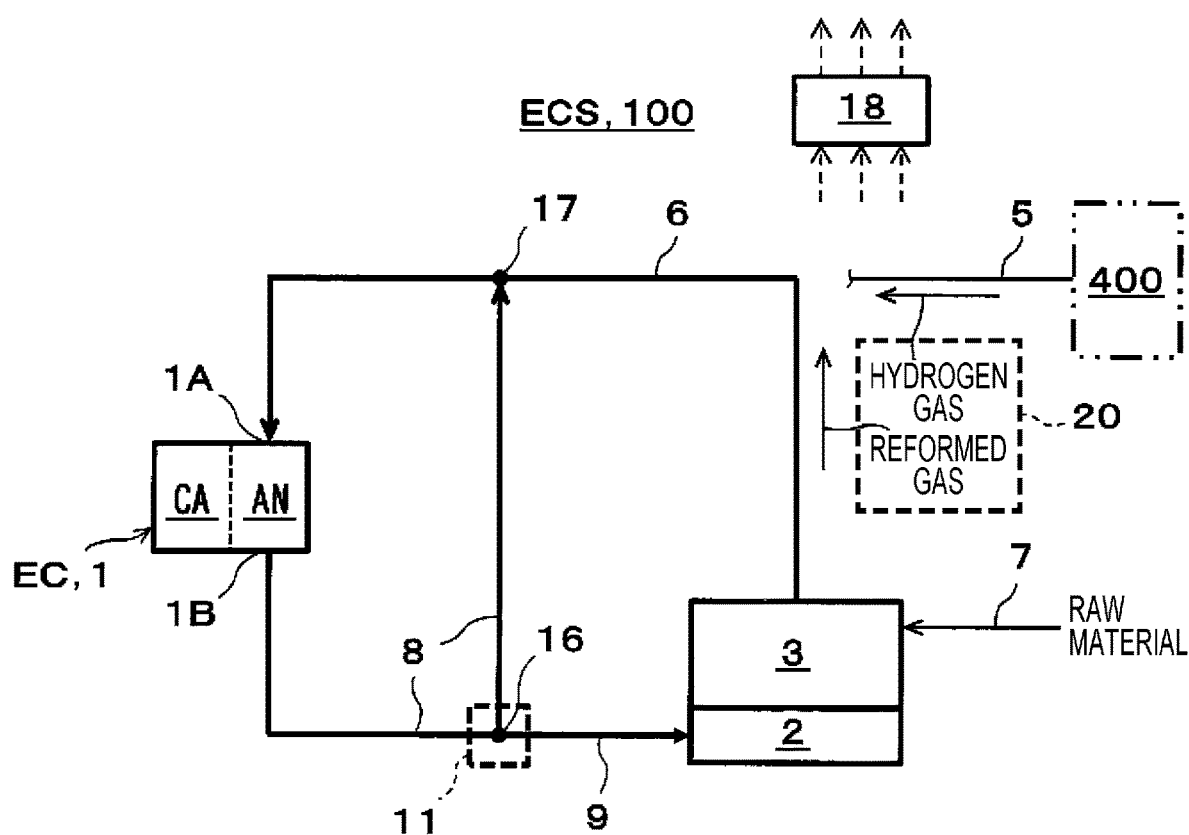
FIG. 1 is a diagram showing an example of an electrochemical apparatus according to a first embodiment.

In general, renewable energy, which is often natural energy such as sunlight or wind power, is unstable under the influence of sunshine conditions, weather, climate, or other conditions. For this reason, in a case where a hydrogen-containing gas is produced, for example, by a water electrolysis apparatus through the use of electric power obtained by such renewable energy, there is a possibility that insufficiency of a hydrogen-containing gas supplied to an electrochemical device might bring about obstacles to continuous running of an electrochemical apparatus.

To address this problem, the following describes measures taken to, in a case where the electrochemical device is a fuel cell, continuously run a fuel cell system in response to insufficiency of a hydrogen-containing gas serving as fuel gas for the fuel cell.

For example, as noted above, Japanese Patent No. 3893945 proposes a hydrogen-recycle fuel cell system that reutilizes (recycles) an anode-off gas (hydrogen-containing gas) by returning, to an anode inlet of a fuel cell, an anode-off gas that was not used in the generation of electricity by the fuel cell. Note here that this system supplies the fuel cell with hydrogen stored in a tank.

At this point in time, assuming that a hydrogen-containing gas produced by a water electrolysis apparatus from the electric power of a photovoltaic power generating system is stored in the tank, a decrease in amount of remaining hydrogen in the tank due to restrictions on tank capacity, a lack of sunshine, or the like may make it necessary to replenish the tank with a hydrogen-containing gas by suspending the running of the fuel cell system.

Meanwhile, as noted above, Japanese Patent No. 4954510 proposes a fuel-reforming fuel cell system that uses a hydrogen-containing reformed gas as fuel gas for a fuel cell. The reformed gas is obtained by reforming city gas, natural gas, LNG, LPG, kerosene, or the like. In this case, heat required for a reforming reaction in a reformer is supplied by burning, with a combustor, an anode-off gas (reformed gas) that was not used in the generation of electricity by the fuel cell.

Given these circumstances, the inventors conceived of the following aspects of the present disclosure by finding that appropriate continuous running of a hydrogen-recycle fuel cell system is made possible by incorporating a fuel-reforming fuel cell into the hydrogen-recycle fuel cell system and using a reformed gas as a backup fuel gas for a hydrogen-containing gas that is used in the generation of electricity by the fuel cell.

Although the foregoing has described measures taken to continuously run a fuel cell system, continuous running of a hydrogen booster system including an electrochemical hydrogen pump, too, is made possible by using an reformed gas instead of a hydrogen-containing gas that is used in a hydrogen boosting operation of the hydrogen pump.

That is, an electrochemical apparatus according to a first aspect of the present disclosure includes: a reformer that produces a first hydrogen-containing gas by reforming a raw material; a combustor that heats the reformer; an electrochemical device that includes an anode and a cathode, the electrochemical device operating by using the first hydrogen-containing gas supplied to the anode; a first flow rate controller that controls a flow rate of the first hydrogen-containing gas supplied to the anode of the electrochemical device and a flow rate of a second hydrogen-containing gas supplied from a supply source, the second hydrogen-containing gas being different from the first hydrogen-containing gas; a second flow rate controller that controls a flow rate at which an anode-off gas exhausted from the anode of the electrochemical device is recycled to the anode of the electrochemical device and a flow rate at which the anode-off gas is supplied to the combustor; and a controller that controls the first flow rate controller and the second flow rate controller.

According to such a configuration, the electrochemical apparatus according to the present aspect can continuously run more appropriately than a conventional one without deactivation of the electrochemical device. For example, in a case where the electrochemical device is a fuel cell, the electrochemical apparatus according to the first aspect, in generating electricity in the fuel cell through the use of the second hydrogen-containing gas supplied from the supply source (e.g. a hydrogen reservoir), can generate electricity in the fuel cell through the use of the first hydrogen-containing gas supplied from the reformer, depending on the situation (such as a case where the amount of second hydrogen-containing gas that is present in the supply source is small). This makes it possible to continue the continuous running of the fuel cell system regardless of whether the amount of second hydrogen-containing gas that is present in the supply source is large or small.

An electrochemical apparatus according to a second aspect of the present disclosure may be directed to the electrochemical apparatus according to the first aspect, wherein when the controller controls the first flow rate controller so that the first hydrogen-containing gas is supplied to the electrochemical device more than the second hydrogen-containing gas, the controller controls the second flow rate controller so that the anode-off gas is supplied to the combustor at a flow rate which is higher than that at which the anode-off gas is recycled.

According to such a configuration, in a case where the flow rate of the first hydrogen-containing gas supplied from the reformer to the electrochemical device is higher than the flow rate of the second hydrogen-containing gas supplied from the supply source to the electrochemical device, the electrochemical apparatus according to the present aspect supplies a larger amount of anode-off gas to the combustor than to the electrochemical device, thereby making it easy to keep the temperature of the reformer at a temperature suitable for a reforming reaction.

An electrochemical apparatus according to a third aspect of the present disclosure may be directed to the electrochemical apparatus according to the first or second aspect, wherein when the controller controls the first flow rate controller so that the second hydrogen-containing gas is supplied to the electrochemical device more than the first hydrogen-containing gas, the controller controls the second flow rate controller so that the anode-off gas is recycled at a flow rate which is higher than that at which the anode-off gas is supplied to the combustor.

According to such a configuration, in a case where the flow rate of the second hydrogen-containing gas supplied from the supply source to the electrochemical device is higher than the flow rate of the first hydrogen-containing gas supplied from the reformer to the electrochemical device, the electrochemical apparatus according to the present aspect supplies (recycles) a larger amount of anode-off gas to the electrochemical device than to the combustor, thereby making it easy to improve the efficiency in the generation of electricity by the electrochemical apparatus.

An electrochemical apparatus according to a fourth aspect of the present disclosure may be directed to the electrochemical apparatus according to any one of the first to third aspects, wherein the first flow rate controller is a first switcher that switches between the first hydrogen-containing gas and the second hydrogen-containing gas as fuel gas for the electrochemical device, and the second flow rate controller is a second switcher that changes between recycling the anode-off gas and supplying the anode-off gas to the combustor.

An electrochemical apparatus according to a fifth aspect of the present disclosure may be directed to the electrochemical apparatus according to any one of the first to third aspects, wherein the first flow rate controller is a first switcher that switches between the first hydrogen-containing gas and the second hydrogen-containing gas as fuel gas for the electrochemical device, the second flow rate controller is a second switcher that changes between recycling the anode-off gas and supplying the anode-off gas to the combustor, and when the controller controls the first switcher so that the first hydrogen-containing gas is supplied to the electrochemical device, the controller controls the second switcher so that the anode-off gas is supplied to the combustor.

According to such a configuration, in a case where the first hydrogen-containing gas supplied from the reformer is used as the fuel gas for the electrochemical device, the electrochemical apparatus according to the present aspect supplies the whole quantity of anode-off gas to the combustor, thereby making it possible to easily keep the temperature of the reformer at a temperature suitable for a reforming reaction.

An electrochemical apparatus according to a sixth aspect of the present disclosure may be directed to the electrochemical apparatus according to any one of the first to third aspects, wherein the first flow rate controller is a first switcher that switches between the first hydrogen-containing gas and the second hydrogen-containing gas as fuel gas for the electrochemical device, the second flow rate controller is a second switcher that changes between recycling the anode-off gas and supplying the anode-off gas to the combustor, and when the controller controls the first switcher so that the second hydrogen-containing gas is supplied to the electrochemical device, the controller controls the second switcher so that the anode-off gas is recycled.

According to such a configuration, in a case where the second hydrogen-containing gas supplied from the supply source is used as the fuel gas for the electrochemical device, the electrochemical apparatus according to the present aspect supplies (recycles) the whole quantity of anode-off gas to the anode of the electrochemical device, thereby allowing the electrochemical apparatus to operate with high efficiency.

An electrochemical apparatus according to a seventh aspect of the present disclosure may be directed to the electrochemical apparatus according to any one of the first to sixth aspects, wherein in starting production of the first hydrogen-containing gas in the reformer while the electrochemical device is operating on the second hydrogen-containing gas, the controller controls the second flow rate controller so that at least a portion of the anode-off gas is supplied to the combustor.

According to such a configuration, by supplying at least a portion of the anode-off gas to the combustor at the stage where the electrochemical device is operating on the second hydrogen-containing gas, the electrochemical apparatus according to the present aspect can raise the temperature of the reformer at an appropriate time to a temperature suitable for a reforming reaction. Therefore, the electrochemical apparatus according to the present aspect can make a smooth transition from the normal running of the electrochemical apparatus, which involves the use of the second hydrogen-containing gas, to the backup running of the electrochemical apparatus, which involves the use of the first hydrogen-containing gas.

An electrochemical apparatus according to an eighth aspect of the present disclosure may be directed to the electrochemical apparatus according to any one of the first to sixth aspects, wherein the controller starts production of the first hydrogen-containing gas in the reformer when an amount of the second hydrogen-containing gas in the supply source decreases while the electrochemical device is operating on the second hydrogen-containing gas.

According to such a configuration, by starting production of the first hydrogen-containing gas in the reformer at an appropriate time at the stage where there is a decrease in the amount of second hydrogen-containing gas in the supply source, the electrochemical apparatus according to the present aspect can make a smooth transition from the normal running of the electrochemical apparatus, which involves the use of the second hydrogen-containing gas, to the backup running of the electrochemical apparatus, which involves the use of the first hydrogen-containing gas.

An electrochemical apparatus according to a ninth aspect of the present disclosure may be directed to the electrochemical apparatus according to any one of the first to eighth aspects, wherein the controller activates the electrochemical device by controlling the first flow rate controller so that the second hydrogen-containing gas is more preferentially supplied to the electrochemical device than the first hydrogen-containing gas.

According to such a configuration, by preferentially supplying the second hydrogen-containing gas supplied from the supply source to the electrochemical device, the electrochemical apparatus according to the present aspect can improve the efficiency in the generation of electricity by the electrochemical device in comparison with a case where the first hydrogen-containing gas supplied from the reformer is preferentially supplied to the electrochemical device.

An electrochemical apparatus according to a tenth aspect of the present disclosure may be directed to the electrochemical apparatus according to any one of the first to ninth aspects, wherein the electrochemical device includes a fuel cell.

An electrochemical apparatus according to an eleventh aspect of the present disclosure may be directed to the electrochemical apparatus according to any one of the first to ninth aspects, wherein the electrochemical device includes a hydrogen pump that causes hydrogen contained in the first hydrogen-containing gas supplied to the anode to move to the cathode via an electrolyte membrane and that boosts the hydrogen.

Incidentally, attention has recently been focused on the construction of an environment-friendly hydrogen system by a combination of an electricity-generating apparatus that uses renewable energy to generate electricity and an electrochemical apparatus that operates on a hydrogen-containing gas.

For example, there is a possibility that a system independent of the existing publicly distributed electricity might be constructed by, during the daytime or the like, producing a hydrogen-containing gas in the water electrolysis apparatus through the use of a surplus of electric power obtained by a photovoltaic power generation system that is not used as electric power for a house and, during the nighttime, generating electricity in the fuel cell through the use of this hydrogen-containing gas.

However, renewable energy, which is often natural energy such as sunlight or wind power, is unstable under the influence of sunshine conditions, weather, climate, or other conditions. For this reason, in a case where a hydrogen-containing gas is produced by the water electrolysis apparatus through the use of electric power obtained by such renewable energy, there is a possibility that a sufficient amount of hydrogen-containing gas might not be stored in the supply source.

In view of this, the inventors conceived of the following aspects of the present disclosure by focusing attention on a magnitude relationship between the energy density of hydrogen gas and the energy density of fossil fuels such as city gas, natural gas, LNG, LPG, and kerosene.

Specifically, for example, in terms of storage of energy in a tank, fossil fuels are higher in energy density per mole than hydrogen gas. Therefore, fossil fuels can store higher energy in smaller amounts than hydrogen gas. Further, fossil fuels are more chemically stable than hydrogen gas and therefore suitable for transportation and storage.

Although the foregoing has described a combination of an electricity-generating apparatus and a fuel cell system that uses renewable energy to generate electricity, the same argument also applies, for example, to a combination of this electricity-generating apparatus and an electrochemical hydrogen booster system.

Therefore, a hydrogen system according to a twelfth aspect of the present disclosure includes: the electrochemical apparatus according to any one of the first to eleventh aspects; an electricity-generating apparatus that uses renewable energy to generate electricity; and a water electrolysis apparatus that produces the second hydrogen-containing gas by electrolysis of water with electric power generated by the electricity-generating apparatus. The supply source stores the second hydrogen-containing gas produced in the water electrolysis apparatus.

According to such a configuration, even in a case of producing the second hydrogen-containing gas through the use of electric power obtained by renewable energy, the hydrogen system according to the present aspect can continuously run more appropriately than a conventional one without deactivation of the electrochemical device.

For example, in a case where the electrochemical device is a fuel cell, using the first hydrogen-containing gas, which is obtained by reforming a fossil fuel (raw material) that is higher in energy density per mole and more chemically stable than hydrogen gas, as a backup fuel gas for the second hydrogen-containing gas makes it possible to stably continue the continuous running of the fuel cell system even in the case of a continuation of a state where unstable renewable energy disables the electricity-generating apparatus to generate electric power.

Embodiments of the present disclosure are described below with reference to the accompanying drawings. The embodiments to be described below illustrate examples of the foregoing aspects. The shapes, materials, constituent elements, locations of placement and forms of connection of constituent elements, and the like that are shown below are mere examples and are not intended to limit the foregoing aspects, unless otherwise noted in the claims. Further, those of the constituent elements which are not recited in an independent claim representing the most generic concept of the present aspect are described as optional constituent elements.

Further, a description of constituent elements given the same signs in the drawings may be omitted. The drawings are intended to schematically show constituent elements for easier comprehension and may not be accurate in terms of shape, dimensional ratio, or the like.

First Embodiment

Apparatus Configuration

FIG. 1 is a diagram showing an example of an electrochemical apparatus according to a first embodiment.

In the example shown in FIG. 1, the electrochemical apparatus ECS includes an electrochemical device EC, a combustor 2, a reformer 3, a reformed gas supply path 6, a recycle path 8, an anode-off gas exhaust path 9, a hydrogen supply path 5, a raw material supply path 7, a second flow rate controller 11, a first flow rate controller 20, and a controller 18.

The electrochemical apparatus ECS may be provided on an as-needed basis with a supply source 400 indicated by chain double-dashed lines in FIG. 1 (and the same applies to the other drawings). Possible examples of the supply source 400 include a hydrogen reservoir and the like such as a tank in which a hydrogen-containing gas is stored.

The reformer 3 is a device that reforms a raw material to produce a first hydrogen-containing gas (hereinafter referred to as "reformed gas"). Specifically, the raw material is reformed in the reformer 3 to form a hydrogen-containing reformed gas. Any form of reforming reaction may take place. Possible examples of the reforming reaction include a steam-reforming reaction, an autothermal reaction, a partial oxidation reaction, and the like.

Although not shown in FIG. 1, a piece of equipment that is needed for any of the reforming reactions is provided as appropriate (and the same applies to the other drawings).

For example, when the reforming reaction is a steam-reforming reaction, the electrochemical apparatus ECS is provided with an evaporator that causes water to evaporate, a water supply path through which to supply water to the evaporator, a water flow rate control apparatus (e.g. a pump or a mass flow controller) for controlling the flow rate of water that flows through the water supply path, and the like. In this case, the reformer 3 and the evaporator may be integrally configured.

When the reforming reaction is an autothermal reaction, the electrochemical apparatus ECS is further provided with an air supplier (e.g. a blower) that supplies the reformer 3 with air or other pieces of equipment in addition to the aforementioned pieces of equipment.

The electrochemical device EC is a device that includes an anode AN and a cathode CA. The electrochemical device operates by using a reformed gas supplied to the anode AN. The electrochemical device EC may be of any configuration, provided it operates on the reformed gas supplied to the anode AN. Possible examples of the electrochemical device EC include a fuel cell, an electrochemical hydrogen pump, and the like.

Now, a configuration and operation of a fuel cell system 100 in which the electrochemical device EC is a fuel cell 1 are described below with reference to FIG. 1. A configuration and operation of an electrochemical apparatus ECS whose electrochemical device EC is a hydrogen pump will be described in section "Second Embodiment".

The fuel cell 1 uses fuel gas to generate electricity. Specifically, fuel gas is supplied to the anode AN of the fuel cell 1, and oxidant gas is supplied to the cathode CA of the fuel cell 1. As a result, hydrogen contained in the fuel gas and oxygen contained in the oxidant gas are brought into a chemical reaction to generate electricity.

In the fuel cell system 100 according to the present embodiment, the fuel gas supplied to the anode AN of the fuel cell 1 is either a second hydrogen-containing gas that will be described in detail below or the aforementioned reformed gas. Further, usable examples of the oxidant gas supplied to the cathode CA of the fuel cell 1 include, but are not limited to, air. In a case where the oxidant gas is air, the fuel cell system 100 may be provided with an air supplier (e.g. a blower) that supplies air to the cathode CA of the fuel cell 1.

The fuel cell 1 may be of any type. Although the fuel cell system 100 according to the present embodiment is described by taking a PEFC as an example of the fuel cell 1, this is not intended to impose any limitation. One possible example is a solid-oxide fuel cell (SOFC).

The reformed gas supply path 6 is a flow passage through which to supply the reformed gas to an anode inlet 1A of the fuel cell 1. As a result, a reformed gas supplied from the reformer 3 through the reformed gas supply path 6 to the anode AN of the fuel cell 1 can be used as fuel gas for the fuel cell 1.

The reformed gas supply path 6 may be provided with a CO reducer for reducing carbon monoxide in the reformed gas produced in the reformer 3. The CO reducer may be either a transformer that reduces carbon monoxide through a shift reaction or a remover that reduces carbon monoxide through either an oxidation reaction or a methanation reaction, or may be both of them.

The raw material supply path 7 is a flow passage through which to supply the raw material to the reformer 3, and is connected to the reformer 3. Examples of the raw material include fossil fuels, such as city gas, natural gas, LNG, LPG, and kerosene, that contain organic compounds composed of at least carbon and hydrogen.

The raw material supply path 7 may be provided with a raw material flow rate control device (such as an on-off valve, a flow rate regulating valve, or a mass flow controller) for controlling the flow rate of a raw material that flows through the raw material supply path 7. Further, in a case where city gas or the like is for example used as the raw material, the raw material supply path 7 may be provided with a desulfurizer for removing a sulfur compound contained in the raw material being supplied to the reformer 3. The desulfurizer may be a cold desulfurizer or may be a hydro-desulfurizer.

The hydrogen supply path 5 is a flow passage through which a second hydrogen-containing gas flows. Although, as shown in FIG. 1, the hydrogen supply path 5 may be a flow passage through which a second hydrogen-containing gas supplied from the supply source 400 flows, this is not intended to impose any limitation. In this case, the hydrogen supply path 5 has its upstream end connected to the supply source 400.

Possible examples of the second hydrogen-containing gas include hydrogen gas and the like stored in the supply source 400 such as a hydrogen reservoir. The hydrogen gas may for example be gas produced by electrolysis of water. Accordingly, the second hydrogen-containing gas is hereinafter referred to as "hydrogen gas".

The first flow rate controller 20 is a device that controls the flow rate of the reformed gas supplied to the anode AN of the fuel cell 1 and the flow rate of hydrogen gas supplied from the supply source 400 supplying hydrogen gas differing from the reformed gas. The first flow rate controller 20 may be of any configuration, provided it can control the flow rates of the reformed gas and the hydrogen gas that are supplied to the anode AN of the fuel cell 1. For example, the first flow rate controller 20 may be a first switcher that switches between the reformed gas and the hydrogen gas as the fuel gas for the fuel cell 1. Further, the first flow rate controller 20 may be a first flow rate regulator that regulates the flow rates of the reformed gas and the hydrogen gas that are supplied to the anode AN of the fuel cell 1.

Note here that the hydrogen supply path 5 has its downstream end connected to the reformed gas supply path 6, the reformer 3, or the raw material supply path 7.

In a case where the hydrogen supply path 5 is connected to the reformed gas supply path 6, hydrogen gas supplied from the hydrogen supply path 5 through the reformed gas supply path 6 to the anode AN of the fuel cell 1 can be used as the fuel gas for the fuel cell 1 under the control of the first flow rate controller 20. Further, under the control of the first flow rate controller 20, the reformed gas produced in the reformer 3 can also be used as the fuel gas for the fuel cell 1 by being supplied to the anode AN of the fuel cell 1 through the reformed gas supply path 6. A specific example of the first flow rate controller 20 in this case will be described in section "First Example".

In a case where the hydrogen supply path 5 is connected to the reformer 3, hydrogen gas supplied from the hydrogen supply path 5 through the reformer 3 and the reformed gas supply path 6 to the anode AN of the fuel cell 1 can be used as the fuel gas for the fuel cell 1 under the control of the first flow rate controller 20. Further, under the control of the first flow rate controller 20, the reformed gas produced in the reformer 3 can also be used as the fuel gas for the fuel cell 1 by being supplied to the anode AN of the fuel cell 1 through the reformed gas supply path 6. A specific example of the first flow rate controller 20 in this case will be described in section "Second Example".

In a case where the hydrogen supply path 5 is connected to the raw material supply path 7, hydrogen gas supplied from the hydrogen supply path 5 through the raw material supply path 7, the reformer 3, and the reformed gas supply path 6 to the anode AN of the fuel cell 1 can be used as the fuel gas for the fuel cell 1 under the control of the first flow rate controller 20. Further, under the control of the first flow rate controller 20, the reformed gas produced in the reformer 3 can also be used as the fuel gas for the fuel cell 1 by being supplied to the anode AN of the fuel cell 1 through the reformed gas supply path 6. A specific example of the first flow rate controller 20 in this case will be described in section "Third Example".

The hydrogen supply path 5 may be provided with a hydrogen flow rate control device (such as an on-off valve, a flow rate regulating valve, or a mass flow controller) for controlling the flow rate of hydrogen gas that flows through the hydrogen supply path 5. Further, in a section of the hydrogen supply path 5 situated downstream of the hydrogen flow rate control device in the direction in which the hydrogen gas flows, the hydrogen supply path 5 may also be provided with a dew-point adjuster (e.g. a humidifier) for adjusting the dew point of the hydrogen gas.

The recycle path 8 is a flow passage that extends from an anode outlet 1B of the fuel cell 1 and joins the reformed gas supply path 6 at a junction 17. As a result, the recycle path

8 and a section of the reformed gas supply path 6 (accurately, a section between the junction 17 and the anode inlet 1A of the fuel cell 1) are used to form a circulation path that extends from the anode outlet 1B of the fuel cell 1 to the anode inlet 1A. This results in a configuration in which an anode-off gas supplied from the anode outlet 1B of the fuel cell 1 can return to the anode inlet 1A of the fuel cell 1, thus allowing the fuel cell 1 to generate electricity with high efficiency.

The combustor 2 is a device that heats the reformer 3. Specifically, the combustor 2 causes the reformer 3 to be heated by burning an anode-off gas exhausted from the anode outlet 1B of the fuel cell 1. This makes it possible to raise the temperature of a reforming catalyst of the reformer 3 to a temperature suitable for a reforming reaction. Any gas may be supplied as an oxygen-containing gas to the combustor 2, and for example, a cathode-off gas that is exhausted from the cathode CA of the fuel cell 1 may be used.

The anode-off gas exhaust path 9 is a flow passage that branches off from the recycle path 8 at a bifurcation 16 and extends to the combustor 2. This makes it possible to supply the anode-off gas, which serves as fuel gas for the combustor 2, through the anode-off gas exhaust path 9 from the bifurcation 16.

The second flow rate controller 11 is a device that controls the flow rate at which the anode-off gas exhausted from the anode AN of the fuel cell 1 is recycled to the anode AN of the fuel cell 1 and the flow rate at which the anode-off gas is supplied to the combustor 2. The second flow rate controller 11 may be of any configuration, provided it can control the flow rate at which such an anode-off gas is recycled to the anode AN of the fuel cell 1 and the flow rate at which the anode-off gas is supplied to the combustor 2. For example, the second flow rate controller 11 may be a second switcher that changes between recycling the anode-off gas and supplying the anode-off gas to the combustor 2. Further, the second flow rate controller 11 may be a second flow rate regulator that regulates the flow rates of the reformed gas and the hydrogen gas that are supplied to the anode AN of the fuel cell 1.

The second flow rate controller 11 is provided either on the anode-off gas exhaust path 9 and on a section of the recycle path 8 between the bifurcation 16 and the junction 17 or on the bifurcation 16. That is, the second flow rate controller 11 is a device that controls the flow rate of an anode-off gas that flows through the section of the recycle path 8 between the bifurcation 16 and the junction 17 and through the anode-off gas exhaust path 9.

The second flow rate controller 11 may for example be constituted by either a three-way valve or a combination of two-way valves. The three-way valve may be a three-way change-over valve provided on the bifurcation 16 or may be a three-way flow rate regulating valve. One of the two-way valves may be an on-off valve provided on the section of the recycle path 8 between the bifurcation 16 and the junction 17 or may be a flow rate regulating valve. The other of the two-way valves may be an on-off valve provided on the anode-off gas exhaust path 9 or may be a flow rate regulating valve.

These specific examples of the second flow rate controller 11 are intended for illustrative purposes and are not intended to impose any limitation.

The controller 18 controls the first flow rate controller 20 and the second flow rate controller 11.

Specifically, while the controller 18 is controlling the first flow rate controller 20 so that the reformed gas is supplied to the fuel cell 1 more than the hydrogen gas, the controller 18 controls the second flow rate controller 11 so that the anode-off gas is supplied to the combustor 2 at a flow rate which is higher than that at which the anode-off gas is recycled.

One example may be such that the first flow rate controller 20 is a first switcher that switches between the reformed gas and the hydrogen gas as the fuel gas for the fuel cell 1, that the second flow rate controller 11 is a second switcher that changes between recycling the anode-off gas and supplying the anode-off gas to the combustor 2, and that while the controller 18 is controlling the first switcher so that the reformed gas is supplied to the fuel cell 1, the controller 18 controls the second switcher so that the anode-off gas is supplied to the combustor 2.

On the other hand, while the controller 18 is controlling the first flow rate controller 20 so that the hydrogen gas is supplied to the fuel cell 1 more than the reformed gas, the controller 18 controls the second flow rate controller 11 so that the anode-off gas is recycled at a flow rate which is higher than that at which the anode-off gas is supplied to the combustor 2.

One example may be such that the first flow rate controller 20 is a first switcher that switches between the reformed gas and the hydrogen gas as the fuel gas for the fuel cell 1, that the second flow rate controller 11 is a second switcher that changes between recycling the anode-off gas and supplying the anode-off gas to the combustor 2, and that while the controller 18 is controlling the first switcher so that the hydrogen gas is supplied to the fuel cell 1, the controller 18 controls the second switcher so that the anode-off gas is recycled.

Note, however, that in thus controlling the first flow rate controller 20 and the second flow rate controller 11, the controller 18 may activate the fuel cell 1 by controlling the first flow rate controller 20 so that the hydrogen gas is more preferentially supplied to the fuel cell 1 than the reformed gas.

In starting production of the reformed gas in the reformer 3 while the fuel cell 1 is using the hydrogen gas to generate electricity, the controller 18 may control the second flow rate controller 11 so that at least a portion of the anode-off gas is supplied to the combustor 2.

Further, the controller 18 may control how the fuel cell system 100 operates as a whole. For example, the controller 18 may start production of the reformed gas in the reformer 3 when the amount of hydrogen gas in the supply source 400 decreases while the fuel cell 1 is using the hydrogen gas to generate electricity. Moreover, in controlling the fuel cell system 100, the controller 18 may be connected to the second flow rate controller 11, the aforementioned raw material flow rate control device, the aforementioned hydrogen flow rate control device, and the water flow rate control device by radio or cable, and, the flow rates of the reformed gas and the hydrogen gas that flow through the reformed gas supply path 6, the anode-off gas flow rate, the raw material flow rate, the flow rate of the hydrogen gas that flows through the hydrogen supply path 5, the water flow rate, and the like may be controlled in accordance with controls signals from the controller 18, respectively.

The controller 18 may be of any configuration, provided it has a control function. The controller 18 includes an arithmetic circuit (not illustrated) and a storage circuit (not illustrated) in which a control program is stored. Possible examples of the arithmetic circuit include an MPU, a CPU, and the like. Possible examples of the storage circuit include a memory and the like. The controller 18 may be constituted by a single controller that exercises centralized control or may be constituted by a plurality of controllers that exercise decentralized control in cooperation with each other.

Operation

An example of how the fuel cell system 100 according to the first embodiment runs (operates) is described below with reference to FIG. 1.

The following operation is performed by the arithmetic circuit of the controller 18 reading out the control program from the storage circuit. Note, however, that it is not necessarily essential that the following operation be performed by the controller 18. An operator may perform a part of the operation.

In a case where a sufficient amount of hydrogen gas is present in the supply source 400, normal running of the fuel cell system 100 that involves the use of the hydrogen gas as the fuel gas is performed. That is, the first flow rate controller 20 is controlled so that the hydrogen gas is more preferentially supplied to the fuel cell 1 than the reformed gas, whereby the fuel cell 1 generates electricity.

At this stage, the first flow rate controller 20 is controlled so that hydrogen gas supplied from the hydrogen supply path 5 is supplied to the anode AN of the fuel cell 1 through the reformed gas supply path 6. Further, the second flow rate controller 11 is controlled so that the whole quantity of anode-off gas flows through the section of the recycle path 8 between the bifurcation 16 and the junction 17. That is, the second flow rate controller 11 shuts off the communication between the recycle path 8 and the anode-off gas exhaust path 9. At this point in time, the combustion operation of the combustor 2 and the operation (reformed gas production) of the reformer 3 are under suspension.

In this way, the recycle path 8 and a section of the reformed gas supply path 6 (accurately, a section between the junction 17 and the anode inlet 1A of the fuel cell 1) are used to form a circulation path that extends from the anode outlet 1B of the fuel cell 1 to the anode inlet 1A, and the anode-off gas exhausted from the anode AN of the fuel cell 1 circulates through this circulation path (that is, the whole quantity of anode-off gas is recycled).

As a result, the efficiency in the generation of electricity by the fuel cell system 100 becomes higher than in a configuration in which the anode-off gas is not recycled.

At this point in time, in the process by which the anode-off gas circulates through the aforementioned circulation path, there is an increase over time in impurity other than hydrogen gas in the anode-off gas. In a case where air is used as the oxidant gas, examples of the impurity include nitrogen gas and the like that leak from the cathode CA of the fuel cell 11 through an electrolyte membrane to the anode AN.

Since an increase in impurity in the anode-off gas leads to a decrease in concentration of hydrogen in the anode-off gas, a purge valve (not illustrated) provided on an exhaust path communicating with the circulation path is temporarily opened at an appropriate time during the generation of electricity by the fuel cell 1, whereby an impurity-containing purge gas is released (purged) into the atmosphere. This makes it possible to reduce the concentration of the impurity in the anode-off gas and makes it possible to recover the concentration of hydrogen in the anode-off gas.

The aforementioned exhaust path may be connected to any place in the circulation path. The exhaust path may for example be the anode-off gas exhaust path 9. In this case, the second flow rate controller 11 may function also as the purge valve. Further, the purge gas may be diluted in the combustor 2.

Next, when there is a decrease in the amount of hydrogen gas that remains in the supply source 400, an operation of switching from the aforementioned normal running of the fuel cell system 100 to backup running of the fuel cell system 100 that involves the use of the reformed gas as the fuel gas is performed.

In the backup running of the fuel cell system 100, a decrease in the amount of hydrogen gas in the supply source 400 during the generation of electricity by the fuel cell 1 through the use of the hydrogen gas leads to the start of production of the reformed gas in the reformer 3. Further, at this point in time, the second flow rate controller 11 is controlled so that at least a portion of the anode-off gas is supplied to the combustor 2. That is, at this stage, the second flow rate controller 11 is controlled so that the whole quantity or a portion of the anode-off gas flows through the anode-off gas exhaust path 9. At this point in time, the combustor 2 heats the reformer 3 by burning the anode-off gas supplied from the anode-off gas exhaust path 9. Moreover, upon a rise in temperature of the reforming catalyst of the reformer 3 to a suitable temperature due to the heat of combustion of the combustor 2, the raw material and water are supplied to the reformer 3, which then produces the reformed gas by reforming the raw material (for example, by steam-reforming). Note, however, such an operation of producing the reformed gas is not described in detail below, as it is the same as operation of a common reforming device.

Next, once the reformer 3 produces the reformed gas by reforming the raw material, the first flow rate controller 20 is controlled so that the reformed gas is supplied from the reformer 3 through the reformed gas supply path 6 to the anode AN of the fuel cell 1.

At this point in time, in a case where a portion of the anode-off gas is flowing through the anode-off gas exhaust path 9, the second flow rate controller 11 is controlled so that the whole quantity of anode-off gas flows through the anode-off gas exhaust path 9. That is, the second flow rate controller 11 shuts off the communication between the section of the recycle path 8 between the bifurcation 16 and the junction 17 and a section of the recycle path 8 situated upstream of the bifurcation 16.

Further, the first flow rate controller 20 is controlled so that the supply of the hydrogen gas supplied from the hydrogen supply path 5 to the anode AN of the fuel cell 1 is stopped.

The timing of the start of supply of the reformed gas to the AN of the fuel cell 1 should be earlier by a predetermined period of time than the timing of the stoppage of supply of the hydrogen gas to the anode AN of the fuel cell 1. This is because if the timing of the start of supply of the reformed gas is later than the timing of the stoppage of supply of the hydrogen gas, there is a possibility that the fuel gas might not be supplied to the anode AN of the fuel cell 1.

Further, the timing at which the second flow rate controller 11 is controlled so that the whole quantity of anode-off gas flows through the anode-off gas exhaust path 9 should be earlier by a predetermined period of time than the start of supply of the reformed gas to the anode AN of the fuel cell 1. This is because if the timing at which the second flow rate controller 11 is controlled is later than the start of supply of the reformed gas to the anode AN of the fuel cell 1, there is a possibility that an anode-off gas derived from the reformed gas might be supplied to the anode AN of the fuel cell 1.

Next, once the supply source 400 is replenished with a sufficient amount of hydrogen gas, an operation of switching from the backup running of the fuel cell system 100 to the normal running of the fuel cell system 100 is performed.

At this stage, the first flow rate controller 20 is controlled so that hydrogen gas supplied from the hydrogen supply path 5 is supplied to the anode AN of the fuel cell 1 through the reformed gas supply path 6.

Further, the production of the reformed gas is stopped by stopping the supply of the raw material and water to the reformer 3. Note, however, such an operation of stopping the production of the reformed gas is not described in detail below, as it is the same as operation of a common reforming device.

Then, the second flow rate controller 11 is controlled so that the whole quantity of anode-off gas flows through the section of the recycle path 8 between the bifurcation 16 and the junction 17. That is, the second flow rate controller 11 shuts off the communication between the recycle path 8 and the anode-off gas exhaust path 9. As a result, the combustion operation of the combustor 2 stops.

The timing of the start of supply of the hydrogen gas to the anode AN of the fuel cell 1 should be earlier by a predetermined period of time than the stoppage of production of the reformed gas. This is because if the timing of the start of supply of the hydrogen gas to the anode AN of the fuel cell 1 is later than the stoppage of production of the reformed gas, there is a possibility that the fuel gas might not be supplied to the anode AN of the fuel cell 1.

Further, it is desirable that the timing at which the second flow rate controller 11 is controlled so that the whole quantity of anode-off gas flows through the section of the recycle path 8 between the bifurcation 16 and the junction 17 be later by a predetermined period of time than the start of supply of the hydrogen gas to the anode of the fuel cell 1. This is because if the timing at which the second flow rate controller 11 is controlled is earlier than the start of supply of the hydrogen gas to the anode AN of the fuel cell 1, there is a possibility that an anode-off gas derived from the reformed gas might be supplied to the anode AN of the fuel cell 1.

As noted above, by using the reformed gas as a backup gas for the hydrogen gas that is used in the generation of electricity by the fuel cell 1, the fuel cell system 100 according to the present embodiment can continuously run more appropriately than a conventional one without stoppage of the generation of electricity by the fuel cell 1. That is, in generating electricity in the fuel cell 1 through the use of the hydrogen gas supplied from the hydrogen supply path 5, the fuel cell system 100 according to the present embodiment can generate electricity in the fuel cell 1 through the use of the reformed gas, depending on the situation (such as a case where the amount of hydrogen gas in the supply source 400 is small). This makes it possible to continue the continuous running of the fuel cell system 100 regardless of whether the amount of hydrogen gas that is present in the supply source 400 is large or small.

Further, in a case where the flow rate of the reformed gas supplied from the reformer 3 to the fuel cell 1 is higher than the flow rate of the hydrogen gas supplied from the supply source 400 to the fuel cell 1, the fuel cell system 100 according to the present embodiment supplies a larger amount of anode-off gas to the combustor 2 than to the fuel cell 1, thereby making it easy to keep the temperature of the reformer 3 at a temperature suitable for a reforming reaction. For example, in a case where the reformed gas supplied from the reformer 3 is used as the fuel gas for the fuel cell 1, supplying the whole quantity of anode-off gas to the combustor 2 makes it possible to easily keep the temperature of the reformer 3 at a temperature suitable for a reforming reaction.

Further, in a case where the flow rate of the hydrogen gas supplied from the supply source 400 to the fuel cell 1 is higher than the flow rate of the reformed gas supplied from the reformer 3 to the fuel cell 1, the fuel cell system 100 according to the present embodiment supplies (recycles) a larger amount of anode-off gas to the fuel cell 1 than to the combustor 2, thereby making it easy to improve the efficiency in the generation of electricity by the fuel cell system 100. For example, in a case where the hydrogen gas supplied from the supply source 400 is used as the fuel gas for the fuel cell 1, supplying (recycling) the whole quantity of anode-off gas to the anode AN of the fuel cell 1 allows the fuel cell system 100 to operate with higher power generation efficiency.

Further, by supplying at least a portion of the anode-off gas to the combustor 2 at the stage where the fuel cell 1 is using the hydrogen gas to generate electricity, the fuel cell system 100 according to the present embodiment can raise the temperature of the reformer 3 at an appropriate time to a temperature suitable for a reforming reaction. Therefore, the fuel cell system 100 according to the present embodiment can make a smooth transition from the normal running of the fuel cell system 100, which involves the use of the hydrogen gas, to the backup running of the fuel cell system 100, which involves the use of the reformed gas.

Further, by starting production of a reformed gas in a reformer 4 at an appropriate time at the stage where there is a decrease in the amount of hydrogen gas in the supply source 400, the fuel cell system 100 according to the present embodiment can make a smooth transition from the normal running of the fuel cell system 100, which involves the use of the hydrogen gas, to the backup running of the fuel cell system 100, which involves the use of the reformed gas.

Further, by preferentially supplying the hydrogen gas supplied from the supply source 400 to the anode AN of the fuel cell 1, the fuel cell system 100 according to the present embodiment can improve the efficiency in the generation of electricity by the fuel cell system 1 in comparison with a case where the reformed gas supplied from the reformer 3 is preferentially supplied to the anode AN of the fuel cell 1.

First Modification

Figure 2A:
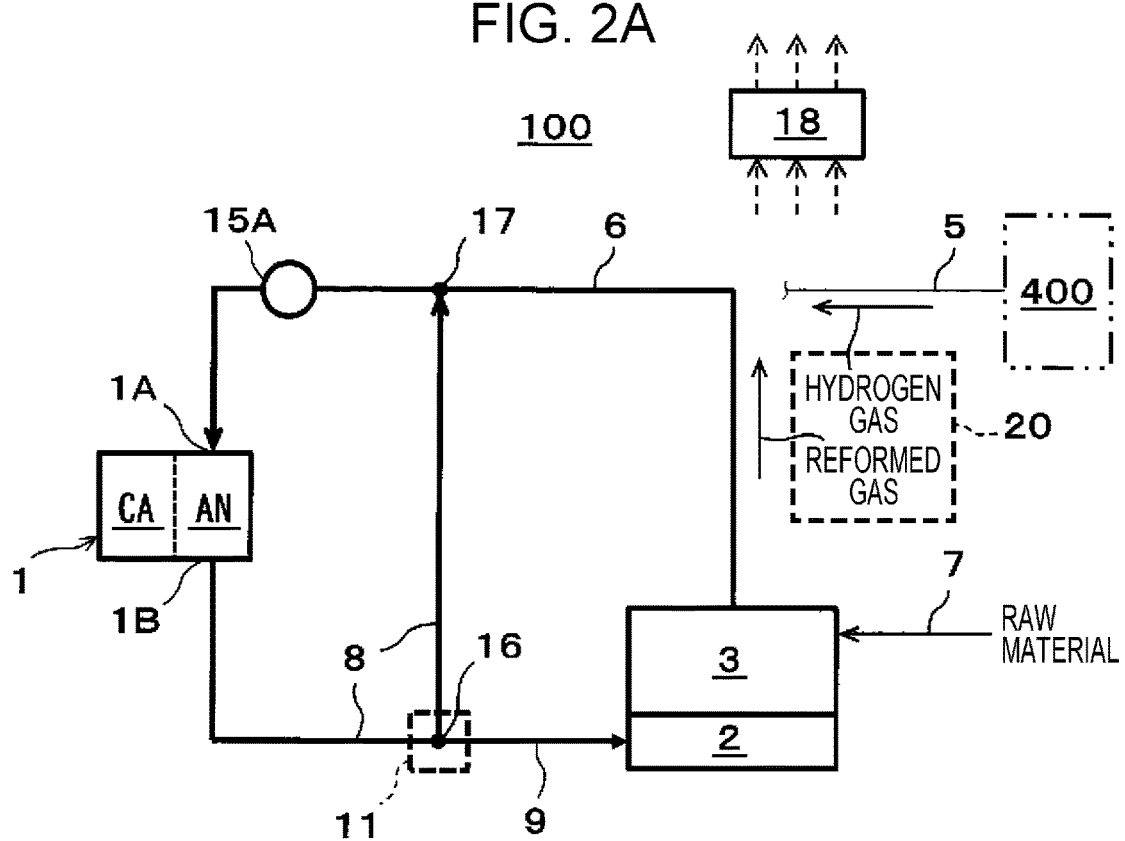
FIG. 2A is a diagram showing an example of a fuel cell system according to a first modification of the first embodiment.

FIG. 2A is a diagram showing an example of a fuel cell system according to a first modification of the first embodiment.

In the example shown in FIG. 2A, the fuel cell system 100 includes a fuel cell 1, a combustor 2, a reformer 3, a reformed gas supply path 6, a recycle path 8, an anode-off gas exhaust path 9, a hydrogen supply path 5, a raw material supply path 7, a booster 15A, a second flow rate controller 11, a first flow rate controller 20, and a controller 18.

The fuel cell 1, the combustor 2, the reformer 3, the reformed gas supply path 6, the recycle path 8, the anode-off gas exhaust path 9, the hydrogen supply path 5, the raw material supply path 7, the second flow rate controller 11, and the first flow rate controller 20 are not described here, as they are the same as those of the first embodiment.

In the fuel cell system 100 according to the present modification, the booster 15A is provided in a section of the reformed gas supply path 6 between the junction 17 and the anode inlet 1A of the fuel cell 1. That is, the booster 15A is a device that pressure-feeds fuel gas (such as a reformed gas or hydrogen gas) to the anode AN of the fuel cell 1.

The booster 15A may be of any configuration, provided it can pressure-feed the fuel gas to the anode AN of the fuel cell 1. For example, the booster 15A may include a flow rate regulating function that is capable of regulating the flow rate of the fuel gas that is fed to the anode AN of the fuel cell 1. Examples of the booster 15A include, but are not limited to, a pump, a compressor, and the like. In this case, the controller 18 may control how the booster 15A operates.

Actions and effects which are brought about by the fuel cell system 100 according to the present modification are not described, as they are the same as those which are brought about by the fuel cell system 100 according to the first embodiment.

The fuel cell system 100 according to the present modification may be the same as the fuel cell system 100 according to the first embodiment except for the aforementioned features.

Second Modification

Figure 2B:
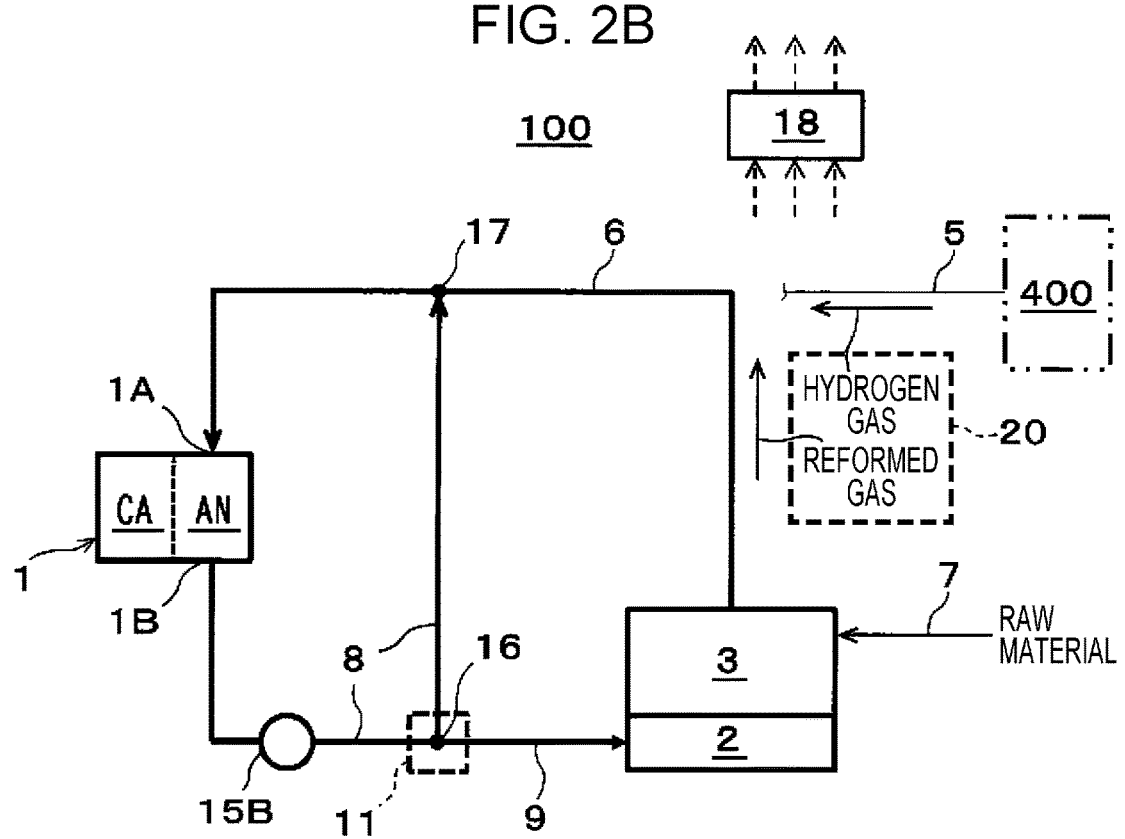
FIG. 2B is a diagram showing an example of a fuel cell system according to a second modification of the first embodiment.

FIG. 2B is a diagram showing an example of a fuel cell system according to a second modification of the first embodiment.

In the example shown in FIG. 2B, the fuel cell system 100 includes a fuel cell 1, a combustor 2, a reformer 3, a reformed gas supply path 6, a recycle path 8, an anode-off gas exhaust path 9, a hydrogen supply path 5, a raw material supply path 7, a booster 15B, a second flow rate controller 11, a first flow rate controller 20, and a controller 18.

The fuel cell 1, the combustor 2, the reformer 3, the reformed gas supply path 6, the recycle path 8, the anode-off gas exhaust path 9, the hydrogen supply path 5, the raw material supply path 7, the second flow rate controller 11, and the first flow rate controller 20 are not described here, as they are the same as those of the first embodiment.

In the fuel cell system 100 according to the present modification, the booster 15B is provided in a section of the recycle path 8 between the anode outlet 1B of the fuel cell 1 and the bifurcation 16. That is, the booster 15B is a device that pressure-feeds an anode-off gas to the second flow rate controller 11.

The booster 15B may be of any configuration, provided it can pressure-feed the anode-off gas to the second flow rate controller 11. For example, the booster 15B may include a flow rate regulating function that is capable of regulating the flow rate of the anode-off gas that is fed to the second flow rate controller 11. Examples of the booster 15B include, but are not limited to, a pump, a compressor, and the like. In this case, the controller 18 may control how the booster 15B operates.

Actions and effects which are brought about by the fuel cell system 100 according to the present modification are not described, as they are the same as those which are brought about by the fuel cell system 100 according to the first embodiment.

The fuel cell system 100 according to the present modification may be the same as the fuel cell system 100 according to the first embodiment except for the aforementioned features.

First Example

Figure 3:
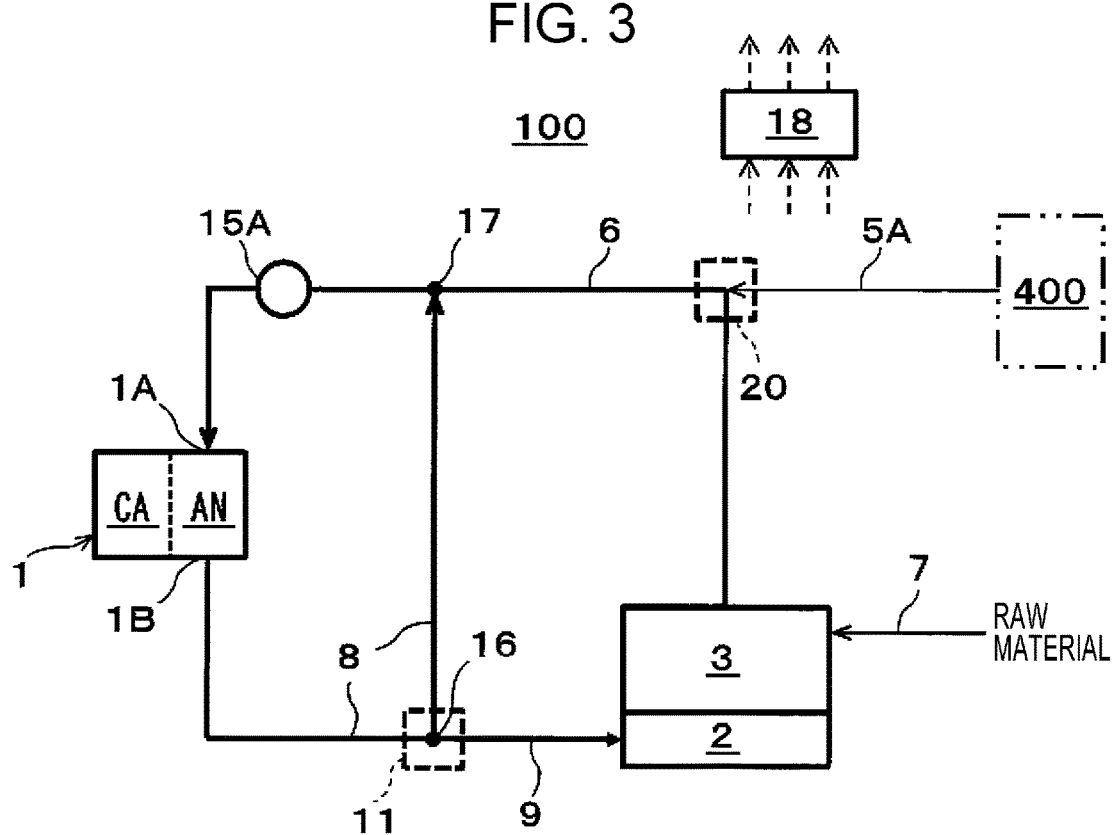
FIG. 3 is a diagram showing an example of a fuel cell system according to a first example of the first embodiment.

FIG. 3 is a diagram showing an example of a fuel cell system according to a first example of the first embodiment.

In the example shown in FIG. 3, the fuel cell system 100 includes a fuel cell 1, a combustor 2, a reformer 3, a reformed gas supply path 6, a recycle path 8, an anode-off gas exhaust path 9, a hydrogen supply path 5A, a raw material supply path 7, a booster 15A, a second flow rate controller 11, a first flow rate controller 20, and a controller 18.

The fuel cell 1, the combustor 2, the reformer 3, the reformed gas supply path 6, the recycle path 8, the anode-off gas exhaust path 9, the raw material supply path 7, and the second flow rate controller 11 are not described here, as they are the same as those of the first embodiment. The booster 15A is not described here, as it is the same as that of the first modification of the first embodiment.

In the fuel cell system 100 according to the present example, the hydrogen supply path 5A is a flow passage connected to the reformed gas supply path 6. That is, the hydrogen supply path 5A has its upstream end connected to the supply source 400 and has its downstream end connected to the reformed gas supply path 6.

In this case, the first flow rate controller 20 may for example be constituted by either a three-way valve or a combination of two-way valves. The three-way valve may be a three-way change-over valve provided on a junction between the hydrogen supply path 5A and the reformed gas supply path 6 or may be a three-way flow rate regulating valve provided on this junction. One of the two-way valves may be an on-off valve provided on a section of the hydrogen supply path 5A situated upstream of the junction or may be a flow rate regulating valve. The other of the two-way valves may be an on-off valve provided on a section of the reformed gas supply path 6 situated upstream of the junction or may be a flow rate regulating valve. Such specific examples of the first flow rate controller 20 are intended for illustrative purposes and are not intended to impose any limitation.

As a result, in the normal running of the fuel cell system 100, control of the first flow rate controller 20 causes the hydrogen gas supplied from the hydrogen supply path 5A to be supplied to the anode AN of the fuel cell 1 via the reformed gas supply path 6. Further, in the backup running of the fuel cell system 100, control of the first flow rate controller 20 causes the reformed gas produced in the reformer 3 to be supplied to the anode AN of the fuel cell 1 via the reformed gas supply path 6.

The hydrogen supply path 5A may have its downstream end connected to any place in the reformed gas supply path 6. For example, although, in the example shown in FIG. 3, the hydrogen supply path 5A has its downstream end connected to a section of the reformed gas supply path 6 between the reformer 3 and the booster 15A, the hydrogen supply path 5A may alternatively have its downstream end connected to a section of the reformed gas supply path 6 between the booster 15A and the anode inlet 1A of the fuel cell 1.

Incidentally, if the hydrogen supply path 5A is connected to the raw material supply path 7 and the reformer 3, the presence of the reformer 3 between the hydrogen supply path 5A and the booster 15A causes a pressure loss. This incurs the possibility of a decrease in efficiency in the generation of electricity by the fuel cell system 100; however, the fuel cell system 100 according to the present example reduces such a possibility, as the hydrogen supply path 5A is connected to the reformed gas supply path 6, which is situated downstream of the reformer 3 in the direction in which the reformed gas flows.

The fuel cell system 100 according to the present example may be the same as the fuel cell system 100 according to any of the first embodiment and the first and second modifications of the first embodiment except for the aforementioned features. For example, although, in the example shown in FIG. 3, the booster 15A is provided in the section of the reformed gas supply path 6 between the junction 17 and the anode inlet 1A of the fuel cell 1, this is not intended to impose any limitation. As shown in FIG. 2B, a booster may be provided in the section of the recycle path 8 between the anode outlet 1B of the fuel cell 1 and the bifurcation 16.

Second Example

Figure 4:
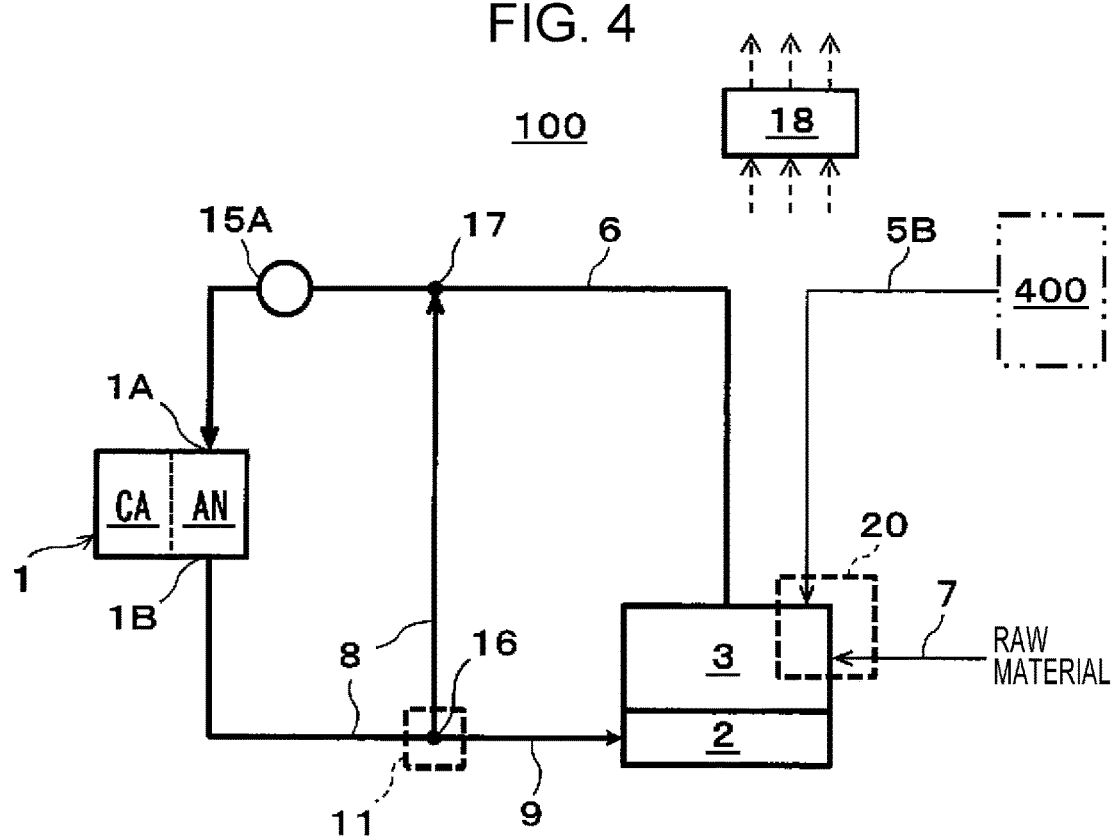
FIG. 4 is a diagram showing an example of a fuel cell system according to a second example of the first embodiment.

FIG. 4 is a diagram showing an example of a fuel cell system according to a second example of the first embodiment.

In the example shown in FIG. 4, the fuel cell system 100 includes a fuel cell 1, a combustor 2, a reformer 3, a reformed gas supply path 6, a recycle path 8, an anode-off gas exhaust path 9, a hydrogen supply path 5B, a raw material supply path 7, a booster 15A, a second flow rate controller 11, a first flow rate controller 20, and a controller 18.

The fuel cell 1, the combustor 2, the reformer 3, the reformed gas supply path 6, the recycle path 8, the anode-off gas exhaust path 9, the raw material supply path 7, and the second flow rate controller 11 are not described here, as they are the same as those of the first embodiment. The booster 15A is not described here, as it is the same as that of the first modification of the first embodiment.

In the fuel cell system 100 according to the present example, the hydrogen supply path 5B is a flow passage connected to the reformer 3. That is, the hydrogen supply path 5B has its upstream end connected to the supply source 400 and has its downstream end connected to the reformer 3.

In this case, the first flow rate controller 20 may be constituted by a combination of a hydrogen flow rate control device (such as a booster, an on-off valve, a flow rate regulating valve, or a mass flow controller) provided on the hydrogen supply path 5B and a raw material flow rate control device (such as a booster, an on-off valve, a flow rate regulating valve, or a mass flow controller) provided on the raw material supply path 7. Such a specific example of the first flow rate controller 20 is intended for illustrative purposes and is not intended to impose any limitation.

As a result, in the normal running of the fuel cell system 100, control of the first flow rate controller 20 causes the hydrogen gas supplied from the hydrogen supply path 5B to be supplied to the anode AN of the fuel cell 1 by passing through the reformer 3 and the reformed gas supply path 6 in this order. Further, in the backup running of the fuel cell system 100, control of the first flow rate controller 20 causes the reformed gas produced in the reformer 3 to be supplied to the anode AN of the fuel cell 1 through the reformed gas supply path 6.

Incidentally, if the hydrogen supply path 5B is connected to the reformed gas supply path 6, the reforming catalyst in the reformer 3 easily suffers oxidation degradation upon deactivation of the reformer 3. However, since the fuel cell system 100 according to the present example has its hydrogen supply path 5B connected to the reformer 3, the hydrogen gas supplied from the hydrogen supply path 5B passes through the reforming catalyst in the reformer 3 upon deactivation of the reformer 3. This makes it possible to keep the reforming catalyst in the reformer 3 in a reducing atmosphere, thus making it possible to reduce oxidation degradation of the reforming catalyst.

The fuel cell system 100 according to the present example may be the same as the fuel cell system 100 according to any of the first embodiment and the first and second modifications of the first embodiment except for the aforementioned features. For example, although, in the example shown in FIG. 4, the booster 15A is provided in the section of the reformed gas supply path 6 between the junction 17 and the anode inlet 1A of the fuel cell 1, this is not intended to impose any limitation. As shown in FIG. 2B, a booster may be provided in the section of the recycle path 8 between the anode outlet 1B of the fuel cell 1 and the bifurcation 16.

Third Example

Figure 5:
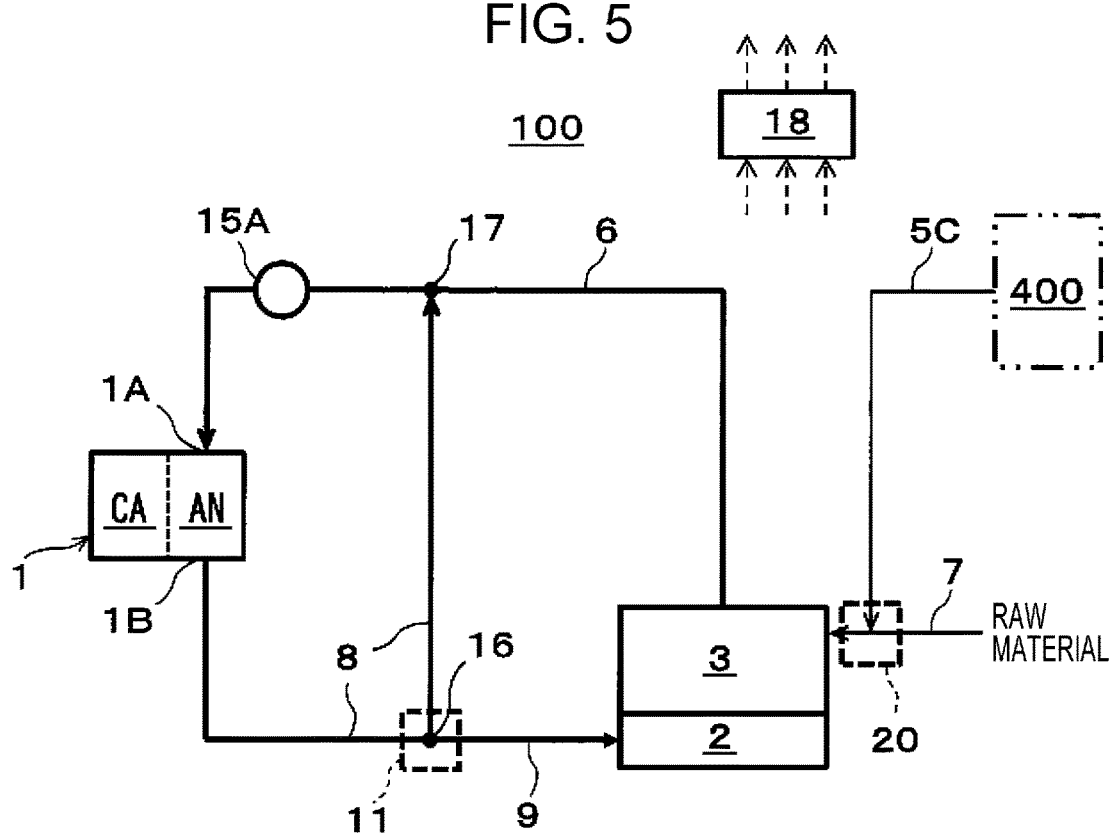
FIG. 5 is a diagram showing an example of a fuel cell system according to a third example of the first embodiment.

FIG. 5 is a diagram showing an example of a fuel cell system according to a third example of the first embodiment.

In the example shown in FIG. 5, the fuel cell system 100 includes a fuel cell 1, a combustor 2, a reformer 3, a reformed gas supply path 6, a recycle path 8, an anode-off gas exhaust path 9, a hydrogen supply path 5C, a raw material supply path 7, a booster 15A, a second flow rate controller 11, a first flow rate controller 20, and a controller 18.

The fuel cell 1, the combustor 2, the reformer 3, the reformed gas supply path 6, the recycle path 8, the anode-off gas exhaust path 9, the raw material supply path 7, and the second flow rate controller 11 are not described here, as they are the same as those of the first embodiment. The booster 15A is not described here, as it is the same as that of the first modification of the first embodiment.

In the fuel cell system 100 according to the present example, the hydrogen supply path 5C is a flow passage connected to the raw material supply path 7. That is, the hydrogen supply path 5C has its upstream end connected to the supply source 400 and has its downstream end connected to the raw material supply path 7.

In this case, the first flow rate controller 20 may for example be constituted by either a three-way valve or a combination of two-way valves. The three-way valve may be a three-way change-over valve provided on a junction between the hydrogen supply path 5C and the raw material gas supply path 7 or may be a three-way flow rate regulating valve provided on this junction. One of the two-way valves may be an on-off valve provided on a section of the hydrogen supply path 5C situated upstream of the junction or may be a flow rate regulating valve. The other of the two-way valves may be an on-off valve provided on a section of the raw material supply path 7 situated upstream of the junction or may be a flow rate regulating valve. Such specific examples of the first flow rate controller 20 are intended for illustrative purposes and are not intended to impose any limitation.

As a result, in the normal running of the fuel cell system 100, control of the first flow rate controller 20 causes the hydrogen gas supplied from the hydrogen supply path 5C to be supplied to the anode AN of the fuel cell 1 by passing through the raw material supply path 7, the reformer 3, and the reformed gas supply path 6 in this order. Further, in the backup running of the fuel cell system 100, control of the first flow rate controller 20 causes the reformed gas produced in the reformer 3 to be supplied to the anode AN of the fuel cell 1 through the reformed gas supply path 6.

The hydrogen supply path 5C may have its downstream end connected to any place in the raw material supply path 7.

For example, in a case where the fuel cell system 100 includes the aforementioned raw material flow rate control device for controlling the flow rate of the raw material that flows through the raw material supply path 7, the hydrogen supply path 5C may have its downstream end connected to a section of the raw material supply path 7 between the reformer 3 and the raw material flow rate control device or connected to a section of the raw material supply path 7 situated upstream of the raw material flow rate control device.

Further, for example, in a case where the fuel cell system 100 includes the aforementioned desulfurizer for removing a sulfur compound contained in the raw material being supplied to the reformer 3, the hydrogen supply path 5C may have its downstream end connected to a section of the raw material supply path 7 between the reformer 3 and the desulfurizer or connected to a section of the raw material supply path 7 situated upstream of the desulfurizer in the direction in which the raw material flows. Note, however, that when the desulfurizer is a hydro-desulfurizer, there is a case where it is desirable that the hydrogen supply path 5C have its downstream end connected to a section of the raw material supply path 7 situated upstream of the hydro-desulfurizer in the direction in which the raw material flows. A reason for this will be stated later.

Incidentally, if the hydrogen supply path 5C is connected to the reformed gas supply path 6, the reforming catalyst in the reformer 3 easily suffers oxidation degradation upon deactivation of the reformer 3. However, since the fuel cell system 100 according to the present example has its hydrogen supply path 5C connected to the raw material supply path 7, the hydrogen gas supplied from the hydrogen supply path 5C passes through the reforming catalyst in the reformer 3 via the raw material supply path 7 upon deactivation of the reformer 3. This makes it possible to keep the reforming catalyst in the reformer 3 in a reducing atmosphere, thus making it possible to reduce oxidation degradation of the reforming catalyst.

Further, for example, when city gas or the like is used as the raw material, the raw material supply path 7 may be provided with a hydro-desulfurizer. In this case, in general, hydrogen required for hydrodesulfurization in the hydro-desulfurizer is often supplied by routing a pipe so that a portion of the reformed gas that is sent out from the reformer 3 returns to the hydro-desulfurizer. However, the fuel cell system 100 according to the present example eliminates the need to route the pipe, as hydrogen can be directly supplied from the hydrogen supply path 5C to the hydro-desulfurizer.

Further, in general, the fuel cell system 100 is often configured such that the reformer 3 is covered with a housing (not illustrated) and the raw material supply path 7 extends so as to reach the reformer 3 after passing through this housing. At this point in time, if the hydrogen supply path 5C is connected to the reformed gas supply path 6 or the reformer 3, the hydrogen supply path 5C is constituted by a pipe provided within the housing. Then, the presence of such a pipe may make it difficult to compactly place constituent members within the housing. Further, this may make it hard to do maintenance on the constituent members within the housing.

However, the fuel cell system 100 according to the third example allows the pipe constituting the hydrogen supply path 5C to be placed outside the housing, as the hydrogen supply path 5C is connected to the raw material supply path 7. Therefore, the fuel cell system 100 according to the present example allows the constituent members within the housing to be more compactly placed than in a case where the hydrogen supply path 5C is connected to the reformed gas supply path 6 or the reformer 3. Further, this brings about improvement in maintainability of the constituent members within the housing.

The fuel cell system 100 according to the present example may be the same as the fuel cell system 100 according to any of the first embodiment and the first and second modifications of the first embodiment except for the aforementioned features. For example, although, in the example shown in FIG. 5, the booster 15A is provided in the section of the reformed gas supply path 6 between the junction 17 and the anode inlet 1A of the fuel cell 1, this is not intended to impose any limitation. As shown in FIG. 2B, a booster may be provided in the section of the recycle path 8 between the anode outlet 1B of the fuel cell 1 and the bifurcation 16.

Fourth Example

Figure 6:
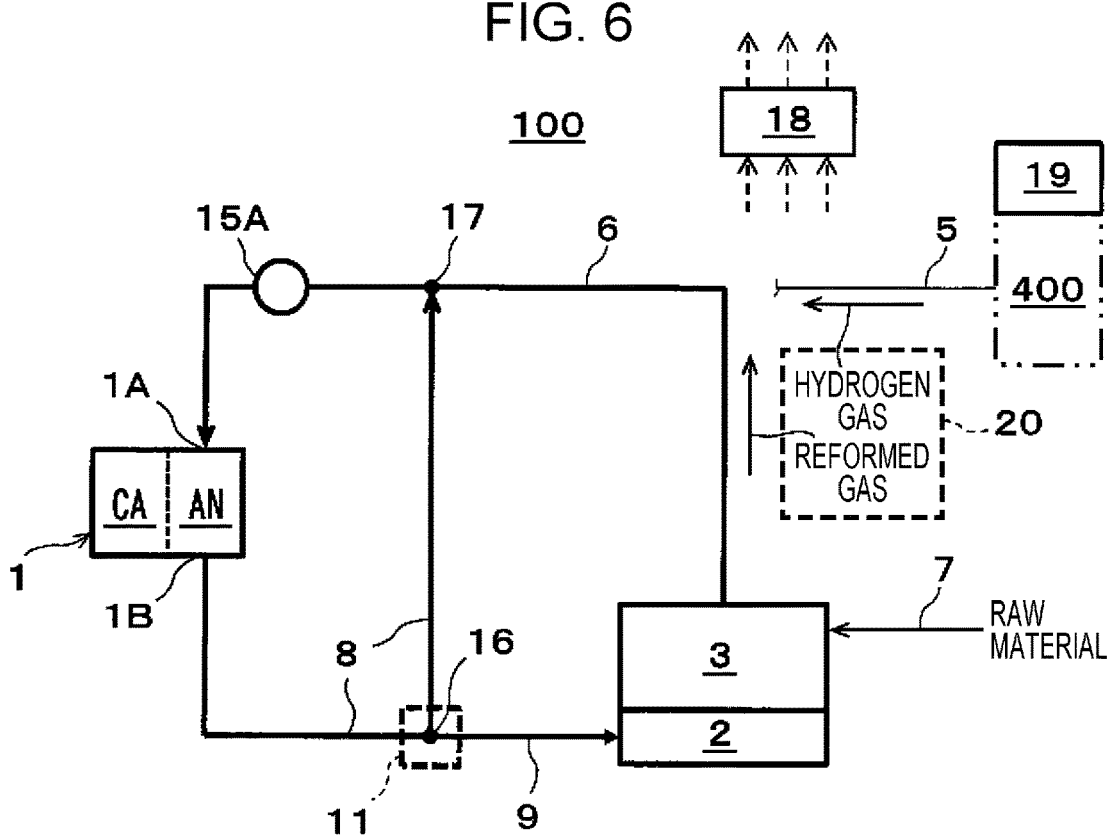
FIG. 6 is a diagram showing an example of a fuel cell system according to a fourth example of the first embodiment.

FIG. 6 is a diagram showing an example of a fuel cell system according to a fourth example of the first embodiment.

In the example shown in FIG. 6, the fuel cell system 100 includes a fuel cell 1, a combustor 2, a reformer 3, a reformed gas supply path 6, a recycle path 8, an anode-off gas exhaust path 9, a hydrogen supply path 5, a raw material supply path 7, a booster 15A, a second flow rate controller 11, a first flow rate controller 20, a controller 18, and a detector 19.

The fuel cell 1, the combustor 2, the reformer 3, the reformed gas supply path 6, the recycle path 8, the anode-off gas exhaust path 9, the hydrogen supply path 5, the raw material supply path 7, the second flow rate controller 11, and the first flow rate controller 20 are not described here, as they are the same as those of the first embodiment. The booster 15A is not described here, as it is the same as that of the first modification of the first embodiment.

The detector 19 is a sensor that detects the amount of hydrogen gas in the supply source 400. The detector 19 may be of any configuration, provided it can detect the amount of hydrogen gas in the supply source 400.

For example, in a case where the supply source 400 is a hydrogen reservoir, the detector 19 may be a pressure detector that detects the pressure of hydrogen gas in the hydrogen reservoir. That is, in a case where a sufficient amount of hydrogen gas is present in the hydrogen reservoir, the hydrogen reservoir is filled with hydrogen gas under high pressure. Therefore, when the pressure detected by the pressure detector reaches a predetermined pressure, a decrease in the amount of hydrogen gas that remains in the hydrogen reservoir can be determined. Specifically, a detection signal from the pressure detector is transmitted to the controller 18 after having been subjected to signal processing by an appropriate signal processing circuit (not illustrated). This allows the controller 18 to determine, on the basis of pressure data from the pressure detector, whether there has been a decrease in the amount of hydrogen gas that remains in the hydrogen reservoir. Alternatively, a pressure detector may be provided in the hydrogen reservoir to directly detect the pressure of the hydrogen gas in the hydrogen reservoir, or a pressure detector may be provided in a predetermined place (e.g. in a pipe constituting the hydrogen supply path 5) correlated with this hydrogen gas pressure to indirectly detect a hydrogen gas pressure.

Alternatively, for example, the detector 19 may be a temperature detector that detects the temperature of the hydrogen gas in the hydrogen reservoir. That is, in a case where a sufficient amount of hydrogen gas is present in the hydrogen reservoir, the hydrogen reservoir is filled with hydrogen gas under high pressure. At this point in time, there is a correlation between the amount of hydrogen gas with which the hydrogen reservoir is filled and the temperature of the hydrogen gas. Therefore, when the temperature detected by the temperature detector reaches a predetermined temperature, a decrease in the amount of hydrogen gas that remains in the hydrogen reservoir can be determined. Specifically, a detection signal from the temperature detector is transmitted to the controller 18 after having been subjected to signal processing by an appropriate signal processing circuit (not illustrated). This allows the controller 18 to determine, on the basis of temperature data from the temperature detector, whether there has been a decrease in the amount of hydrogen gas that remains in the hydrogen reservoir. Alternatively, a temperature detector may be provided in the hydrogen reservoir to directly detect the temperature of the hydrogen gas in the hydrogen reservoir, or a temperature detector may be provided in a predetermined place (e.g. on a surface of the pipe constituting the hydrogen supply path 5) correlated with this hydrogen gas temperature to indirectly detect a hydrogen gas temperature. Possible examples of the temperature detector include, but are not limited to, thermocouples and the like.

The controller 18 controls the first flow rate controller 20 and the second flow rate controller 11 in accordance with a detection signal from the detector 19.

This allows the fuel cell system 100 according to the present example to, in generating electricity in the fuel cell 1 through the use of the hydrogen gas supplied from the hydrogen supply path 5, appropriately detect, with the detector 19, whether the amount of hydrogen gas that is present in the supply source 400 is larger or small. Therefore, by the controller 18 controlling, in accordance with such a detection signal, how the first flow rate controller 20 and the second flow rate controller 11 operate, it is made possible to, at an appropriate time during generation of electricity in the fuel cell 1 through the use of the hydrogen gas, switch to an operation (i.e. the backup running of the fuel cell system 100) of generating electricity in the fuel cell 1 through the use of the reformed gas. Further, it is also made possible to, at an appropriate time during generation of electricity in the fuel cell 1 through the use of the reformed gas, return to an operation (i.e. the normal running of the fuel cell system 100) of generating electricity in the fuel cell 1 through the use of the hydrogen gas.

The contents of control exercised by the controller 18 are intended for illustrative purposes and are not intended to impose any limitation.

For example, detection signals from both the pressure detector and the temperature detector may be transmitted to the controller 18 after having been subjected to signal processing by an appropriate signal processing circuit (not illustrated).

This allows the controller 18 to more highly accurately determine, on the basis of these two pieces of data, whether there has been a decrease in the amount of hydrogen gas that is present in the supply source 400 than in a case where the controller 18 determines, on the basis of either pressure data from the pressure detector or temperature data from the temperature detector, whether there has been a decrease in the amount of hydrogen gas that is present in the supply source 400.

The fuel cell system 100 according to the present example may be the same as the fuel cell system 100 according to any of the first embodiment, the first and second modifications of the first embodiment, and the first to third examples of the first embodiment except for the aforementioned features. For example, although, in the example shown in FIG. 6, the booster 15A is provided in the section of the reformed gas supply path 6 between the junction 17 and the anode inlet 1A of the fuel cell 1, this is not intended to impose any limitation. As shown in FIG. 2B, a booster may be provided in the section of the recycle path 8 between the anode outlet 1B of the fuel cell 1 and the bifurcation 16.

Second Embodiment

Apparatus Configuration

Figure 7:
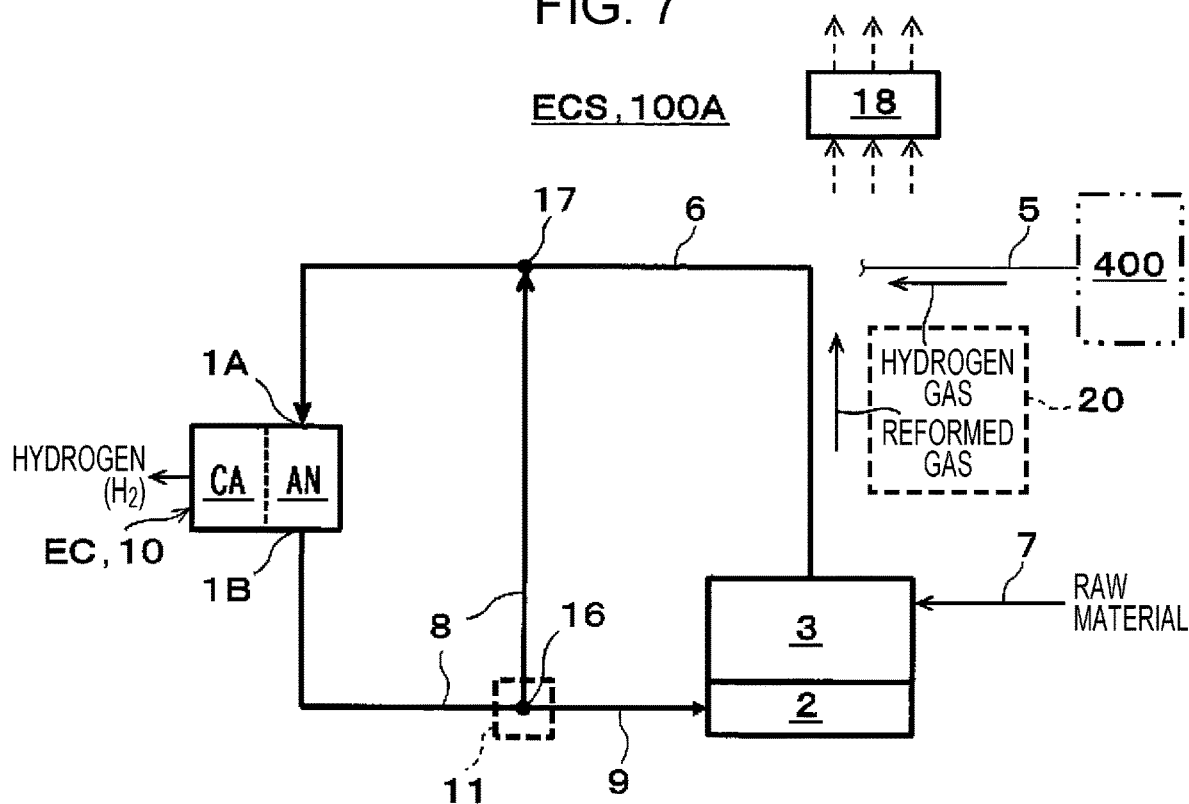
FIG. 7 is a diagram showing an example of an electrochemical apparatus according to a second embodiment.

FIG. 7 is a diagram showing an example of an electrochemical apparatus according to a second embodiment.

In the example shown in FIG. 7, the electrochemical apparatus ECS includes an electrochemical device EC, a combustor 2, a reformer 3, a reformed gas supply path 6, a recycle path 8, an anode-off gas exhaust path 9, a hydrogen supply path 5, a raw material supply path 7, a second flow rate controller 11, a first flow rate controller 20, and a controller 18.

The present embodiment is the same as the fuel cell system 100 according to any of the first embodiment, the first and second modifications of the first embodiment, and the first to fourth examples of the first embodiment, except that a hydrogen booster system 100A, which is an example of the electrochemical apparatus ECS, includes a hydrogen pump 10 as the electrochemical device EC.

The hydrogen pump 10 is a device that causes hydrogen contained in the reformed gas supplied to the anode AN to move to the cathode CA via an electrolyte membrane and that boosts the hydrogen. Such an electrochemical booster device based on an electrolyte membrane is not described in detail below, as it is publicly known.

Operation

An example of running (operation) of the hydrogen booster system 100A according to the second embodiment is described below with reference to FIG. 7. Note, however, that the operation of the hydrogen booster system 100A is not described in detail, as it is the same as the operation of the fuel cell system 100, except that the operation of generating electricity in the fuel cell 1 of the fuel cell system 100 described in section "First Embodiment" is replaced by the following hydrogen boosting operation of the hydrogen pump 10.

The following operation may be performed, for example, by the arithmetic circuit of the controller 18 reading out the control program from the storage circuit. Note, however, that it is not necessarily essential that the following operation be performed by the controller 18. An operator may perform a part of the operation.

First, in normal running of the hydrogen booster system 100A, control of the first flow rate controller 20 causes a low-pressure hydrogen gas supplied from the hydrogen supply path 5 to be supplied to the anode AN of the hydrogen pump 10 and causes a voltage of a voltage applicator (not illustrated) to be applied between the anode AN and the cathode CA of the hydrogen pump 10.

Meanwhile, in backup running of the hydrogen booster system 100A, control of the first flow rate controller 20 causes a low-pressure reformed gas produced in the reformer 3 to be supplied to the anode AN of the hydrogen pump 10 and causes a voltage of the voltage applicator (not illustrated) to be applied between the anode AN and the cathode CA of the hydrogen pump 10.

Then, in an anode catalyst layer of the anode AN, an oxidation reaction takes place, whereby a hydrogen molecule ($H_2$) in the hydrogen gas or the reformed gas separates into hydrogen ions (protons) and electrons (Formula (1)). The protons move to a cathode catalyst layer of the cathode CA through the electrolyte membrane. The electrons move to a cathode catalyst layer 12 through the voltage applicator.

Then, in the cathode catalyst layer, a reduction reaction takes place, whereby a hydrogen molecule is produced again (Formula (2)).

At this point in time, hydrogen (H$_2$) produced at the cathode CA can be boosted by increasing a pressure loss of a hydrogen lead-out pathway through the use of a flow rate regulator (not illustrated). A possible example of the flow rate regulator is a back pressure valve, a regulating valve, or the like provided in the hydrogen lead-out pathway.

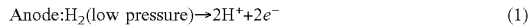

$$\text{Anode:} H_2(\text{low pressure}) \rightarrow 2H^+ + 2e^- \quad (1)$$

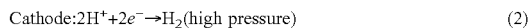

$$\text{Cathode:} 2H^+ + 2e^- \rightarrow H_2(\text{high pressure}) \quad (2)$$

Thus, in the hydrogen pump 10, hydrogen (H$_2$) in the hydrogen gas or the reformed gas supplied to the anode AN is boosted at the cathode CA by applying a voltage with the voltage applicator. This causes the hydrogen pump 10 to perform the hydrogen boosting operation. Further, the boosted hydrogen of the hydrogen pump 10 may be supplied to a hydrogen-demanding body at an appropriate time. Possible examples of the hydrogen-demanding body include a fuel cell and the like.

As noted above, by using the reformed gas as a backup gas for the hydrogen gas that is used in the hydrogen boosting operation of the hydrogen pump 10, the hydrogen booster system 100A according to the present embodiment can continuously run more appropriately than a conventional one without stoppage of the hydrogen boosting operation of the hydrogen pump 10. That is, in boosting hydrogen with the hydrogen pump 10 through the use of the hydrogen gas supplied from the hydrogen supply path 5, the hydrogen booster system 100A according to the present embodiment can boost hydrogen with the hydrogen pump 10 through the use of the reformed gas, depending on the situation (such as a case where the amount of hydrogen gas in the supply source 400 is small). This makes it possible to continue the continuous running of the hydrogen booster system 100A regardless of whether the amount of hydrogen gas that is present in the supply source 400 is large or small. Actions and effects which are brought about by the hydrogen booster system 100A according to the present embodiment other than the aforementioned actions and effects are not described in detail, as they can be easily understood from those which are brought about by the fuel cell system 100 described in section "First Embodiment".

The hydrogen booster system 100A according to the present embodiment may be the same as the fuel cell system 100 according to any of the first embodiment, the first and second modifications of the first embodiment, and the first to fourth examples of the first embodiment except for the aforementioned features.

Third Embodiment

Apparatus Configuration

Figure 8:
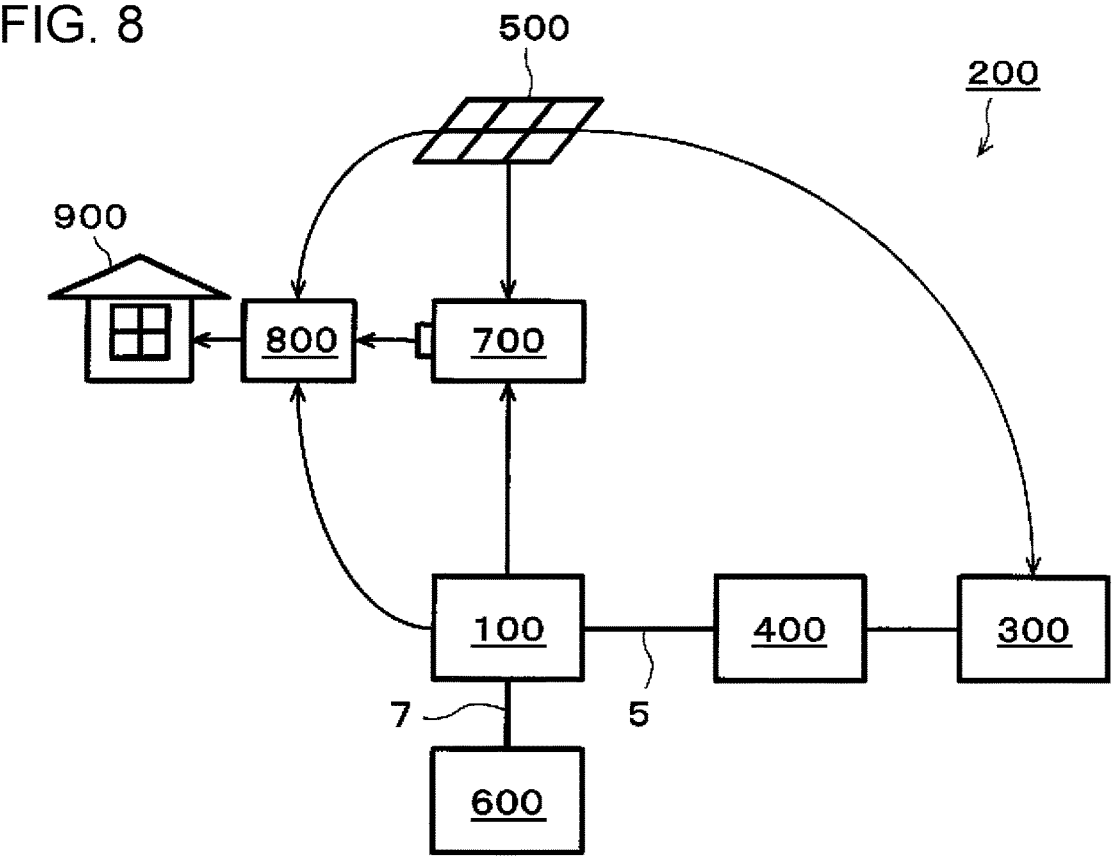
FIG. 8 is a diagram showing an example of a hydrogen system according to a third embodiment.

FIG. 8 is a diagram showing an example of a hydrogen system according to a third embodiment.

Incidentally, attention has recently been focused on the construction of an environment-friendly hydrogen system by a combination of an electricity-generating apparatus that uses renewable energy to generate electricity and an electrochemical apparatus that operates on a hydrogen-containing gas. Possible examples of the electrochemical apparatus include the aforementioned fuel cell system 100, the aforementioned hydrogen booster system 100A, and the like.

Now, a configuration and operation of a hydrogen system 200 whose electrochemical apparatus is a fuel cell system 100 are described below with reference to FIG. 8.

In the example shown in FIG. 8, the hydrogen system 200 includes a fuel cell system 100, an electricity-generating apparatus 500, a water electrolysis apparatus 300, a supply source 400, and a raw material reservoir 600.

Note here that the fuel cell system 100 is the same as the fuel cell system 100 according to any of the first embodiment, the first and second modifications of the first embodiment, and the first to fourth examples of the first embodiment. Therefore, the fuel cell system 100 is not described or illustrated in detail below.

The electricity-generating apparatus 500 is an apparatus 500 that uses renewable energy to generate electricity. The electricity-generating apparatus 500 causes electric power generated by the electricity-generating apparatus 500 to be supplied to a house 900 (e.g. a distribution board of the house 900), a storage battery 700, and the water electrolysis apparatus 300 on an as-needed basis. The electricity-generating apparatus 500 may be of any type, provided it includes such an electricity-generating function. Possible examples of the electricity-generating apparatus 500 include, but are not limited to, a photovoltaic power generating system. For example, the renewable energy may be wind power or the like. In a case where the electricity-generating apparatus 500 is a photovoltaic power generating system, the photovoltaic power generating system may have its solar panel installed on the rooftop of the house 900.

The storage battery 700 is a battery that can be used with repeated charge and discharge. The storage battery 700 causes electric power stored in the storage battery 700 to be supplied to the house 900 (distribution board) on an as-needed basis. The storage battery 700 may be of any type, provided it includes such an electricity storage function.

The water electrolysis apparatus 300 is an apparatus that produces hydrogen gas by electrolysis of water with the electric power generated by the electricity-generating apparatus 500. The water electrolysis apparatus 300 may employ any type of water electrolysis method. Possible examples of water electrolysis methods include alkaline water electrolysis, solid polymer water electrolysis, solid oxide water electrolysis, and the like.

Although not illustrated, a piece of equipment that is needed to produce hydrogen gas in the water electrolysis apparatus 300 is provided as appropriate. For example, there may be provided a water pump for supplying water to the water electrolysis apparatus 300, an electrolyte for conducting ions generated by electrolysis of water, and the like. Further, there may be provided a voltage applicator that applies a voltage to the electrolyte.

The supply source 400 is an apparatus that stores hydrogen gas produced in the water electrolysis apparatus 300. Possible examples of the supply source 400 include a hydrogen reservoir. In this case, the hydrogen reservoir is an apparatus, connected to the water electrolysis apparatus 300 and the hydrogen supply path 5, that stores the hydrogen gas produced in the water electrolysis apparatus 300. In the hydrogen reservoir, hydrogen gas produced by electrolysis of water in the water electrolysis apparatus 300 is stored in various states such as air or liquid. That is, the hydrogen reservoir may be of any configuration, provided it can store such hydrogen gas. Possible examples of the hydrogen reservoir include, but are not limited to, a tank. Further, the hydrogen reservoir may have hydrogen stored therein in a hydrogen gas state, may have hydrogen stored therein by being adsorbed to an alloy, or may have hydrogen stored therein in liquid form.

In this way, the hydrogen gas produced in the water electrolysis apparatus 300 can be temporarily stored in the supply source 400. Further, in the normal running of the fuel cell system 100, the hydrogen gas of the supply source 400 can be supplied to the fuel cell 1 of the fuel cell system 100 through the hydrogen supply path 5.

The raw material reservoir 600 is an apparatus, connected to the raw material supply path 7, that stores the raw material. The raw material reservoir 600 may be of any configuration, provided it can store the raw material. Possible examples of the raw material reservoir 600 include, but are not limited to, a tank. The raw material reservoir 600 may be an LPG gas cylinder or a tank in which kerosene is stored. The hydrogen system 200 does not need to include such a raw material reservoir 600. For example, the raw material supply path 7 may be a pipe, drawn from outside into the system, through which the raw material, such as city gas, is flowing.

Thus, in the backup running of the fuel cell system 100, the raw material of the raw material reservoir 600 can be supplied to the reformer 3 of the fuel cell system 100 through the raw material supply path 7. As mentioned above, examples of the raw material include fossil fuels, such as city gas, natural gas, LNG, LPG, and kerosene, that contain organic compounds composed of at least carbon and hydrogen.

The electricity-generating apparatus 500, the storage battery 700, and the fuel cell system 100 are connected to the housing 900 (distribution panel) via an electric power converter 800 (e.g. a DC/AC converter).

Operation

An example of running (operation) of the hydrogen system 200 according to the third embodiment is described below with reference to FIG. 8.

The following operation may be performed, for example, by the arithmetic circuit of the controller 18 reading out the control program from the storage circuit. Note, however, that it is not necessarily essential that the following operation be performed by the controller 18. An operator may perform a part of the operation.

In a case where the electricity-generating apparatus 500 generates enough electric power to provide the amount of electric power that is consumed by an electric power load provided in the house 900 (when the electricity-generating apparatus 500 is a photovoltaic power generating system, examples of such cases include a case where the sunshine condition is good, a case where the house 900 has low electric power demand, or other cases), an amount of generated electric power that is equivalent to the amount of electric power that is consumed by the electric power load is supplied to the house 900 and a surplus of the electric power generated by the electricity-generating apparatus 500 is supplied to at least either the storage battery 700 or the water electrolysis apparatus 300 on an as-needed basis. At this point in time, the storage battery 700 may be given priority over the water electrolysis apparatus 300 to receive the electric power generated from the electricity-generating apparatus 500.

In this way, the storage battery 700 is charged. Further, hydrogen gas is produced in the water electrolysis apparatus 300, and the hydrogen gas produced in the water electrolysis apparatus 300 is stored in the supply source 400.

On the other hand, in a case where the electricity-generating apparatus 500 does not generate enough electric power to provide the amount of electric power that is consumed by an electric power load provided in the house 900 (when the electricity-generating apparatus 500 is a photovoltaic power generating system, examples of such cases include a case where the sunshine condition is bad, a case where the house 900 has high electric power demand, or other cases), a shortfall of the amount of electric power that is consumed by the electric power load is supplied from at least either the storage battery 700 or the fuel cell system 100.

At this point in time, in a case where a sufficient amount of hydrogen gas is stored in the supply source 400 when a shortfall of the amount of electric power that is consumed by the electric power load is supplied from the fuel cell system 100 to the house 900, the normal running of the fuel cell system 100 is performed. This allows the fuel cell system 100 to generate electricity with high efficiency.

In general, renewable energy, which is often natural energy such as sunlight or wind power, is unstable under the influence of sunshine conditions, weather, climate, or other conditions. For this reason, in a case where hydrogen gas is produced by the water electrolysis apparatus 300 through the use of electric power obtained by such renewable energy, there is a possibility that a sufficient amount of hydrogen gas might not be stored in the supply source 400.

To address this problem, in a case where a sufficient amount of hydrogen gas is not stored in the supply source 400, the backup running of the fuel cell system 100 is performed. This allows the fuel cell system 100 to generate electricity even in a case where a sufficient amount of hydrogen gas is not stored in the supply source 400.

Further, when, during the normal running of the fuel cell system 100, there is a decrease in the amount of hydrogen gas that remains in the supply source 400, an operation of switching from the normal running of the fuel cell system 100 to the backup running of the fuel cell system 100 is performed. This allows the fuel cell system 100 to continue to generate electricity even in a case where there is a decrease in the amount of hydrogen gas that remains in the supply source 400.

Further, when the supply source 400 is replenished with a sufficient amount of hydrogen gas during the backup running of the fuel cell system 100, an operation of switching from the backup running of the fuel cell system 100 to the normal running of the fuel cell system 100 is performed. This allows the fuel cell system 100 to change to generating electricity with high efficiency.

The above-mentioned normal running and backup running of the fuel cell system 100 are not described in detail below, as they are the same as those of the first embodiment.

As noted above, even in a case of producing hydrogen gas through the use of electric power obtained by renewable energy, the hydrogen system 200 according to the present embodiment can continuously run more appropriately than a conventional one without stoppage of the generation of electricity by the fuel cell 1. For example, a fossil fuel (raw material) that is higher in energy density per mole and more chemically stable than hydrogen gas is stored in the raw material reservoir 600. Therefore, by using, as a backup fuel gas for hydrogen gas, a reformed gas that is obtained by reforming such a raw material, the continuous running of the fuel cell system 100 can be stably continued even in the case of a continuation of a state where unstable renewable energy disables the electricity-generating apparatus 500 to generate electric power.

It should be noted that the first embodiment, the first and second modifications of the first embodiment, the first to fourth examples of the first embodiment, the second embodiment, and the third embodiment may be combined with each other unless they are mutually exclusive.

Further, it is clear from the foregoing description that many improvements and other embodiments of the present disclosure are apparent to persons skilled in the art. Accordingly, the foregoing description should be construed solely as illustration and is provided for the purpose of teaching persons skilled in the art the best mode of carrying out the present disclosure. Details of the structures and/or functions of the present disclosure can be substantially modified without departing from the spirit of the present disclosure.

An aspect of the present disclosure is applicable to an electrochemical apparatus that continuously runs more appropriately than a conventional one without deactivation of an electrochemical device.

Further, an aspect of the present disclosure is applicable to a hydrogen system that continuously runs more appropriately than a conventional one without deactivation of an electrochemical device even in a case where a hydrogen-containing gas is produced through the use of electric power obtained by renewable energy.

What is claimed is:

1. An electrochemical apparatus comprising:
   a reformer that produces a first hydrogen-containing gas by reforming a raw material;
   a combustor that heats the reformer;
   an electrochemical device that includes an anode and a cathode, the electrochemical device operating by using the first hydrogen-containing gas supplied to the anode;
   a first flow rate controller that controls a flow rate of the first hydrogen-containing gas and a flow rate of a second hydrogen-containing gas supplied from a supply source, the first hydrogen-containing gas and the second hydrogen-containing gas being to be supplied to the anode of the electrochemical device, the second hydrogen-containing gas being different from the first hydrogen-containing gas;
   a second flow rate controller that controls a flow rate at which an anode-off gas exhausted from the anode of the electrochemical device is recycled to the anode of the electrochemical device and a flow rate at which the anode-off gas is supplied to the combustor; and
   a controller that is programmed to control the first flow rate controller and the second flow rate controller by performing at least one of:
   (i) when the controller controls the first flow rate controller so that the first hydrogen-containing gas is supplied to the anode more than the second hydrogen-containing gas, the controller controls the second flow rate controller so that the anode-off gas is supplied to the combustor at a flow rate which is higher than that at which the anode-off gas is recycled, or
   (ii) when the controller controls the first flow rate controller so that the second hydrogen-containing gas is supplied to the anode more than the first hydrogen-containing gas, the controller controls the second flow rate controller so that the anode-off gas is recycled at a flow rate which is higher than that at which the anode-off gas is supplied to the combustor.

2. The electrochemical apparatus according to claim 1, wherein the first flow rate controller is a first switcher that switches between the first hydrogen-containing gas and the second hydrogen-containing gas as fuel gas for the electrochemical device, and
   the second flow rate controller is a second switcher that changes between recycling the anode-off gas and supplying the anode-off gas to the combustor.

3. The electrochemical apparatus according to claim 1, wherein the first flow rate controller is a first switcher that switches between the first hydrogen-containing gas and the second hydrogen-containing gas as fuel gas for the electrochemical device,
   the second flow rate controller is a second switcher that changes between recycling the anode-off gas and supplying the anode-off gas to the combustor, and
   the controller is further programmed to perform, when the controller controls the first switcher so that the first hydrogen-containing gas is supplied to the electrochemical device, controlling the second switcher so that the anode-off gas is supplied to the combustor.

4. The electrochemical apparatus according to claim 1, wherein the first flow rate controller is a first switcher that switches between the first hydrogen-containing gas and the second hydrogen-containing gas as fuel gas for the electrochemical device,
   the second flow rate controller is a second switcher that changes between recycling the anode-off gas and supplying the anode-off gas to the combustor, and
   the controller is further programmed to perform, when the controller controls the first switcher so that the second hydrogen-containing gas is supplied to the electrochemical device, controlling the second switcher so that the anode-off gas is recycled.

5. The electrochemical apparatus according to claim 1, wherein in starting production of the first hydrogen-containing gas in the reformer while the electrochemical device is operating on the second hydrogen-containing gas, the controller is further programmed to control the second flow rate controller so that at least a portion of the anode-off gas is supplied to the combustor.

6. The electrochemical apparatus according to claim 1, wherein the controller is further programmed to start production of the first hydrogen-containing gas in the reformer by supplying a part of the anode-off gas to the combustor, when an amount of the second hydrogen-containing gas in the supply source decreases while the electrochemical device is operating on the second hydrogen-containing gas.

7. The electrochemical apparatus according to claim 1, wherein the controller is further programmed to activate the electrochemical device by controlling the first flow rate controller so that the second hydrogen-containing gas is more preferentially supplied to the electrochemical device than the first hydrogen-containing gas.

8. The electrochemical apparatus according to claim 1, wherein the electrochemical device includes a fuel cell.

9. The electrochemical apparatus according to claim 1, wherein the electrochemical device includes a hydrogen pump that causes hydrogen contained in the first hydrogen-containing gas supplied to the anode to move to the cathode via an electrolyte membrane and that boosts the hydrogen.

10. A hydrogen system comprising:
    the electrochemical apparatus according to claim 1;
    an electricity-generating apparatus that uses renewable energy to generate electricity; and
    a water electrolysis apparatus that produces the second hydrogen-containing gas by electrolysis of water with electric power generated by the electricity-generating apparatus,
    wherein the supply source stores the second hydrogen-containing gas produced in the water electrolysis apparatus.

* * * * *